(12) United States Patent
Whelan

(10) Patent No.: US 9,805,085 B2
(45) Date of Patent: *Oct. 31, 2017

(54) LOCATING AMBIGUITIES IN DATA

(71) Applicant: The Boeing Company, Chicago, IL (US)

(72) Inventor: John Desmond Whelan, Burien, WA (US)

(73) Assignee: THE BOEING COMPANY, Chicago, IL (US)

( * ) Notice: Subject to any disclaimer, the term of this patent is extended or adjusted under 35 U.S.C. 154(b) by 526 days.

This patent is subject to a terminal disclaimer.

(21) Appl. No.: 13/973,391

(22) Filed: Aug. 22, 2013

(65) Prior Publication Data

US 2014/0006359 A1    Jan. 2, 2014

Related U.S. Application Data

(63) Continuation of application No. 13/190,212, filed on Jul. 25, 2011, now Pat. No. 8,521,769.

(51) Int. Cl.
*G06F 17/30* (2006.01)

(52) U.S. Cl.
CPC .. *G06F 17/30371* (2013.01); *G06F 17/30477* (2013.01); *G06F 17/30507* (2013.01); *G06F 17/30722* (2013.01); *G06F 17/30997* (2013.01)

(58) Field of Classification Search
CPC .............. G06F 17/28; G06F 17/30864; G06F 17/30654; G06F 17/30522; G06F 17/30672; G06F 17/30675; G06F 17/30979; G06F 17/30448; G06F 17/30669; G06F 17/30991; G06F 17/30424; G06F 17/30011;
(Continued)

(56) References Cited

U.S. PATENT DOCUMENTS 5,974,396 A    10/1999    Anderson et al.
6,925,460 B2   8/2005     Kummamuru et al.
(Continued)

FOREIGN PATENT DOCUMENTS

CN    101785002 A    7/2010
EP    0520684 A2     12/1992
EP    1463307 A2     9/2004

OTHER PUBLICATIONS

European Search Report, dated Dec. 13, 2012, regarding Application No. EP12177518.3, 6 pages.
(Continued)

*Primary Examiner* — Michelle Owyang
(74) *Attorney, Agent, or Firm* — Yee & Associates, P.C.

(57) ABSTRACT

A system comprising an associative memory, an input module, a query module, and a display module. The input module is configured to receive a value within a first perspective of the associative memory. The query module is configured to perform an open query of the associative memory using the value, perform the open query within at least one of an insert perspective and a second perspective of the associative memory. The at least one of the insert perspective and the second perspective has as many or more category associations for the value relative to the first perspective. The display module is configured to display a result of the query and to display a list of one or more potential ambiguities that result from the open query.

20 Claims, 15 Drawing Sheets

(58) Field of Classification Search
CPC ......... G06F 17/30997; G06F 17/30684; G06F 17/30731; G06F 17/30477; G06F 17/30451
USPC .................................................. 707/705–780
See application file for complete search history.

(56) References Cited

U.S. PATENT DOCUMENTS

| | | |
|---|---|---|
| 6,993,288 B2 | 1/2006 | de La Chapelle et al. |
| 7,027,974 B1 | 4/2006 | Busch et al. |
| 7,376,618 B1 | 5/2008 | Anderson et al. |
| 7,617,176 B2 | 11/2009 | Zeng et al. |
| 7,711,743 B2 | 5/2010 | Cavagnaro et al. |
| 7,747,559 B2 | 6/2010 | Leitner et al. |
| 7,756,864 B2 | 7/2010 | Chandrasekar et al. |
| 7,769,628 B2 | 8/2010 | Mathews et al. |
| 7,831,559 B1 | 11/2010 | Mohan et al. |
| 7,885,963 B2 | 2/2011 | Sanders |
| 7,890,514 B1 | 2/2011 | Mohan et al. |
| 7,912,849 B2 | 3/2011 | Ohrn et al. |
| 8,073,860 B2 | 12/2011 | Venkataraman et al. |
| 8,126,908 B2 | 2/2012 | Vasudevan et al. |
| 8,161,045 B2 | 4/2012 | Arnold et al. |
| 8,214,361 B1 * | 7/2012 | Sandler et al. ............... 707/732 |
| 8,239,425 B1 | 8/2012 | Bell et al. |
| 2003/0154071 A1 | 8/2003 | Shreve |
| 2004/0024760 A1 | 2/2004 | Toner et al. |
| 2005/0222929 A1 | 10/2005 | Steier et al. |
| 2005/0278362 A1 | 12/2005 | Maren et al. |
| 2006/0026152 A1 | 2/2006 | Zeng et al. |
| 2006/0074891 A1 | 4/2006 | Chandrasekar et al. |
| 2006/0224682 A1 | 10/2006 | Inmon |
| 2007/0067320 A1 | 3/2007 | Novak |
| 2007/0244892 A1 | 10/2007 | Narancic |
| 2008/0040316 A1 | 2/2008 | Lawrence |
| 2008/0044016 A1 | 2/2008 | Henzinger |
| 2008/0114725 A1 | 5/2008 | Indeck et al. |
| 2008/0189260 A1 | 8/2008 | Arnold et al. |
| 2008/0313143 A1 | 12/2008 | Warn et al. |
| 2008/0320042 A1 | 12/2008 | Arnold et al. |
| 2009/0019028 A1 | 1/2009 | Norris et al. |
| 2009/0119268 A1 | 5/2009 | Bandaru et al. |
| 2009/0144295 A1 | 6/2009 | Mion et al. |
| 2009/0204507 A1 | 8/2009 | Cockayne et al. |
| 2009/0204610 A1 | 8/2009 | Hellstrom et al. |
| 2009/0282010 A1 | 11/2009 | Vasudevan et al. |
| 2009/0300482 A1 | 12/2009 | Summers et al. |
| 2010/0106485 A1 | 4/2010 | Lu et al. |
| 2010/0114899 A1 | 5/2010 | Guha et al. |
| 2010/0205121 A1 | 8/2010 | Quadracci et al. |
| 2010/0205192 A1 | 8/2010 | Quadracci et al. |
| 2010/0205198 A1 | 8/2010 | Mishne et al. |
| 2010/0205212 A1 | 8/2010 | Quadracci et al. |
| 2010/0228693 A1 | 9/2010 | Dawson et al. |
| 2010/0257006 A1 | 10/2010 | Quadracci et al. |
| 2010/0268673 A1 | 10/2010 | Quadracci |
| 2010/0306249 A1 | 12/2010 | Hill et al. |
| 2011/0295854 A1 | 12/2011 | Chiticariu et al. |
| 2011/0307356 A1 | 12/2011 | Wiesinger et al. |
| 2012/0089620 A1 | 4/2012 | Castellanos et al. |
| 2012/0101860 A1 | 4/2012 | Ezzat |
| 2012/0203747 A1 | 8/2012 | Douetteau et al. |
| 2012/0203752 A1 | 8/2012 | Ha-Thuc et al. |
| 2012/0278336 A1 | 11/2012 | Malik et al. |
| 2013/0006610 A1 | 1/2013 | Quadracci et al. |
| 2013/0031123 A1 | 1/2013 | Whelan |
| 2013/0031325 A1 | 1/2013 | Nakamoto et al. |
| 2014/0188919 A1 | 7/2014 | Huffman et al. |

OTHER PUBLICATIONS

Office Action, dated Aug. 30, 2012, regarding U.S. Appl. No. 13/190,212, 22 pages.
Final Office Action, dated Feb. 11, 2013, regarding U.S. Appl. No. 13/190,212, 31 pages.
Notice of Allowance, dated Apr. 29, 2013, regarding U.S. Appl. No. 13/190,212, 11 pages.
Office Action, dated Mar. 13, 2014, regarding U.S. Appl. No. 13/173,028, 22 pages. (10-1359 (24691-399)).
Office Action, dated Aug. 20, 2014, regarding U.S. Appl. No. 13/173,028, 19 pages. (10-1359 (24691-399)).
Final Office Action, dated Jan. 9, 2015, regarding U.S. Appl. No. 13/173,028, 22 pages. (10-1359 (24691-399)).
Office Action, dated May 7, 2015, regarding U.S. Appl. No. 13/173,028, 21 pages. (10-1359 (24691-399)).
Final Office Action, dated Oct. 2, 2015, regarding U.S. Appl. No. 13/173,028, 23 pages. (10-1359 (24691-399)).
Office Action, dated Feb. 26, 2016, regarding U.S. Appl. No. 13/173,028, 28 pages. (10-1359 (24691-399)).
Notice of Allowance, dated Jul. 28, 2016, regarding U.S. Appl. No. 13/173,028, 12 pages. (10-1359 (24691-399)).

* cited by examiner

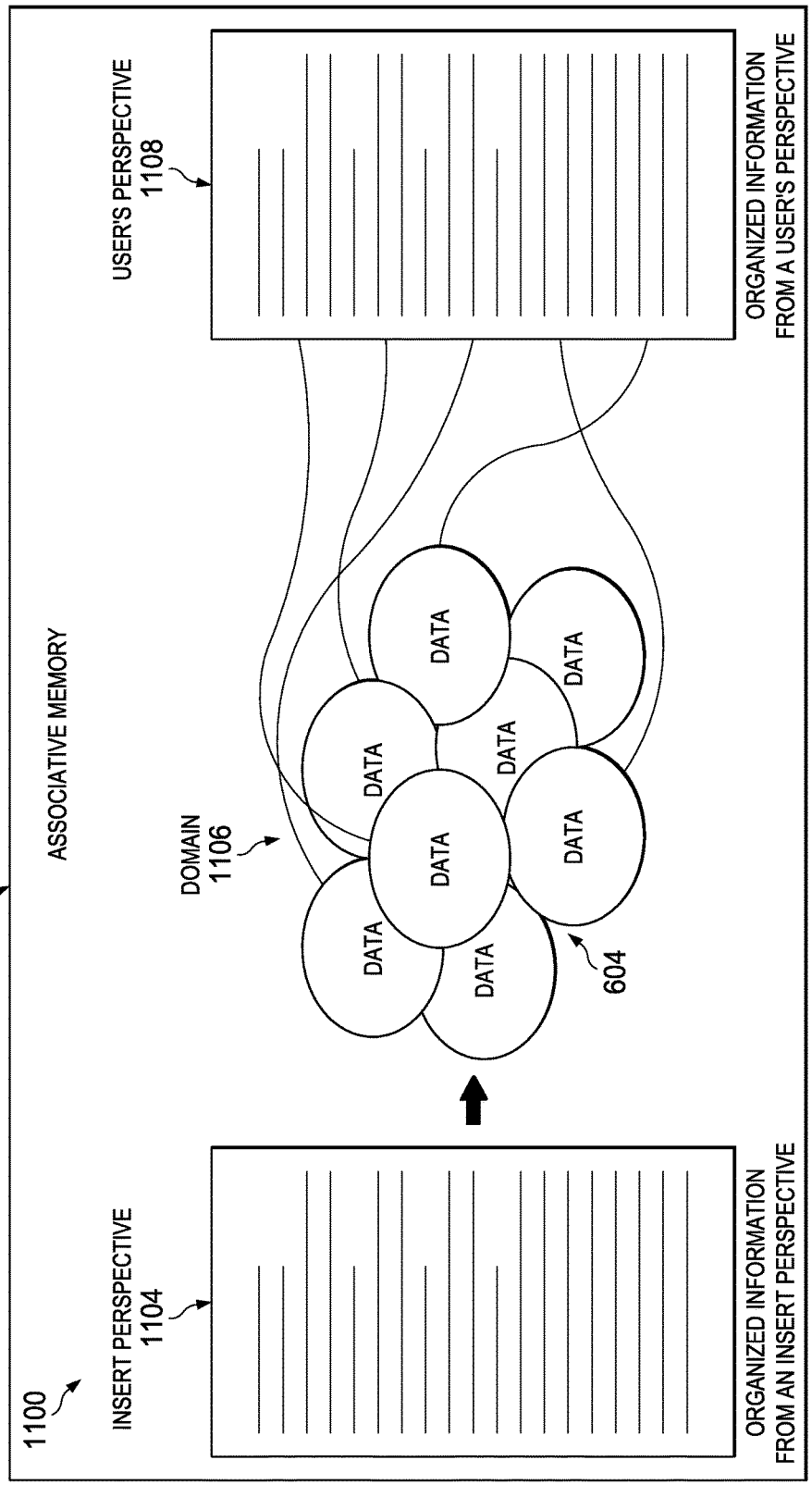

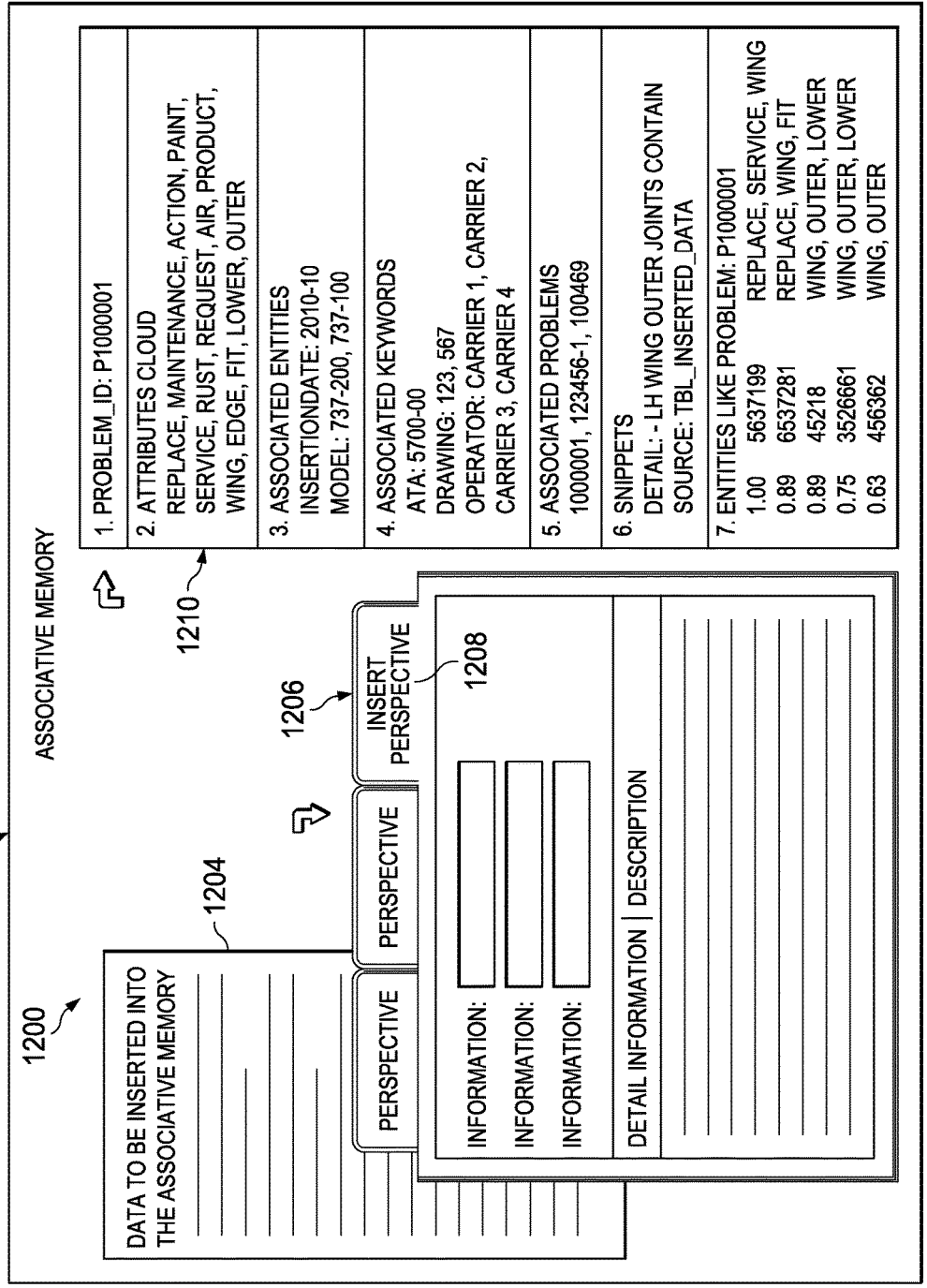

1501 PERSPECTIVE

1500

1502 ENTER INFORMATION FOR: FRONT COIL SPRING

| REQUIRED | OPTIONAL | EXCLUDED |
|---|---|---|
| COIL<br><br>1504 | SPRING TIRE FRONT<br><br>1506 | <br><br>1508 |

ASSOCIATED REPORT

| SCORE | REPORT | MATCHING ATTRIBUTES |
|---|---|---|
| 1.00 | 10252101 | TIRE, COIL, FRONT, SPRING |
| 0.92 | 10251943 | TIRE, COIL, FRONT, SPRING |
| 0.90 | 10248757 | TIRE, COIL, FRONT, SPRING |
| 0.89 | 10251035 | TIRE, COIL, FRONT, SPRING |

1510

ASSOCIATED INFORMATION

| CATEGORY | ATTRIBUTES |
|---|---|
| REPORT_REFNUM | 10251986, 10252101, 10248757, 10251035, 10250667, 10251311, 10251808, 10251956 |
| MAKE | TYPE 1, TYPE 2, TYPE 3, TYPE 4, TYPE 5, TYPE 6 |
| MANUFACTURER | COMPANY 1, COMPANY 2, COMPANY 3 |
| MODEL | MODEL 1, MODEL 2, MODEL 3, MODEL 4, MODEL 5, MODEL 6 |

LOCATING AMBIGUITIES IN DATA

This application is a continuation of U.S. patent application Ser. No. 13/190,212, filed Jul. 25, 2011, status allowed.

BACKGROUND INFORMATION

1. Field

The present disclosure relates generally to associative memory management and in particular to finding the presence of ambiguities in data stored within an associative memory for the purpose of reducing information obfuscation which can improve decision making.

2. Background

When analyzing data, ambiguous data can cause confusion, delay, and possibly errors in an analysis. As used herein, "ambiguous data" may be a set of data that is associated with two or more distinct categories. The "set of data" may be a value, which may be a number, an alphanumeric string of characters, a symbol, or as described elsewhere herein. "Categories" are groupings of data as arranged by a user or a data processing system.

For instance, the number "123-456-7890" could be a phone number, or perhaps could be a part number, or perhaps could be associated with some other category. In this case, the number "123-456-7890" is a "set of data" or a value. This set of data is associated with both a phone number and a part number. The phone number is a first category and the part number is a second category. In some cases a user could not know, by viewing the number alone, to which category the number belonged. Or, in a broader sense, the user might not be able to distinguish if the data might have been ambiguous in the first place, regardless of the presence of a second category. Thus, a comparison may not be needed in order to find the presence of ambiguous data.

A multiplicity of ambiguities may arise where the same number sequence is associated with many different categories, or perhaps special characters such as the two hyphens in 123-456-7890 are ignored by a search engine, thereby creating even greater numbers of ambiguities. Furthermore, a user may view the set of data as belonging to multiple categories, thereby increasing the complexity of the data analysis. However, a user may not even be aware of the presence of ambiguous data in a data set, which may be perhaps more problematic.

As indicated above, in some instances, if these ambiguities are not identified, errors in a data analysis may result. For example, ambiguous data may provide misleading statistics, or perhaps inaccurate counts when totaling large amounts of data. In addition, when searching large data sets, ambiguous data can cloud result sets and cause frustration when a user is trying to obtain useful information. For example, if a user enters the part number into a search engine, the user may see in the returned results house numbers, phone numbers, and many other categories which satisfy the number's form, but are of no interest to the user. Therefore, it may be advantageous for a user to understand if a possibility of ambiguity exists in one or more data sources in order to avoid issues with data obfuscation, and thereby improve decision making.

SUMMARY

An embodiment of the present disclosure provides for a system including an associative memory comprising a plurality of data and a plurality of associations among the plurality of data. The plurality of data is collected into associated groups. The associative memory is configured to be queried based on at least one relationship, selected from a group that includes direct and indirect relationships, among the plurality of data in addition to direct correlations among the plurality of data. The system also includes an input module configured to receive a value within a first perspective of the associative memory. The first perspective comprises a first choice of context for a group of data within the plurality of data. The system also includes a query module configured to perform an open query of the associative memory using the value. The query module is further configured to perform the open query within at least one of an insert perspective and a second perspective of the associative memory. The insert perspective comprises a type of perspective which is configured to be fed back into the associative memory. The second perspective comprises a second choice of context for the group of data. The at least one of the insert perspective and the second perspective has as many or more category associations for the value relative to the first perspective. The system also includes a display module configured to display a result of the query. The display module is further configured to display a list of one or more potential ambiguities that result from the open query.

Another advantageous embodiment provides for a computer implemented method. The computer implemented method includes receiving a value within a first perspective of an associative memory. The first perspective comprises a first choice of context for a group of data within the plurality of data. The associative memory comprises a plurality of data and a plurality of associations among the plurality of data. The plurality of data is collected into associated groups. The associative memory is configured to be queried based on indirect relationships among the plurality of data in addition to direct correlations among the plurality of data. The computer implemented method also includes performing an open query of the associative memory using the value, wherein the open query is performed within at least one of an insert perspective and a second perspective of the associative memory. The insert perspective comprises a type of perspective which is configured to be fed back into the associative memory. The second perspective comprises a second choice of context for the group of data. The at least one of the insert perspective and the second perspective has as many or more category associations for the value relative to the first perspective. The computer implemented method also includes displaying a result of the query, including displaying a list of one or more potential ambiguities that result from the open query.

Another advantageous embodiment provides for a non-transitory computer readable storage medium storing computer readable code. The computer readable code includes computer readable code for receiving a value within a first perspective of an associative memory. The first perspective comprises a first choice of context for a group of data within the plurality of data. The associative memory comprises a plurality of data and a plurality of associations among the plurality of data. The plurality of data is collected into associated groups. The associative memory is configured to be queried based on indirect relationships among the plurality of data in addition to direct correlations among the plurality of data. The computer readable code also includes computer readable code for performing an open query of the associative memory using the value. The open query is performed within at least one of an insert perspective and a second perspective of the associative memory. The insert perspective comprises a type of perspective which is configured to be fed back into the associative memory. The second perspective comprises a second choice of context for the group of data. The at least one of the insert perspective and the second perspective has as many or more category associations for the value relative to the first perspective. The computer readable code also includes computer readable code for displaying a result of the query, including displaying a list of one or more potential ambiguities that result from the open query.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 11 is a drawing illustrating an insert perspective of associative memories for quick decision making, in accordance with an advantageous embodiment;

FIG. 12 is a drawing illustrating use of an insert perspective of an associative memory, in accordance with an advantageous embodiment;

FIG. 15 is a drawing illustrating a worksheet view for results derived as a result of querying an associative memory to uncover non-obvious relationships, in accordance with an advantageous embodiment.

DETAILED DESCRIPTION

Figure 1:
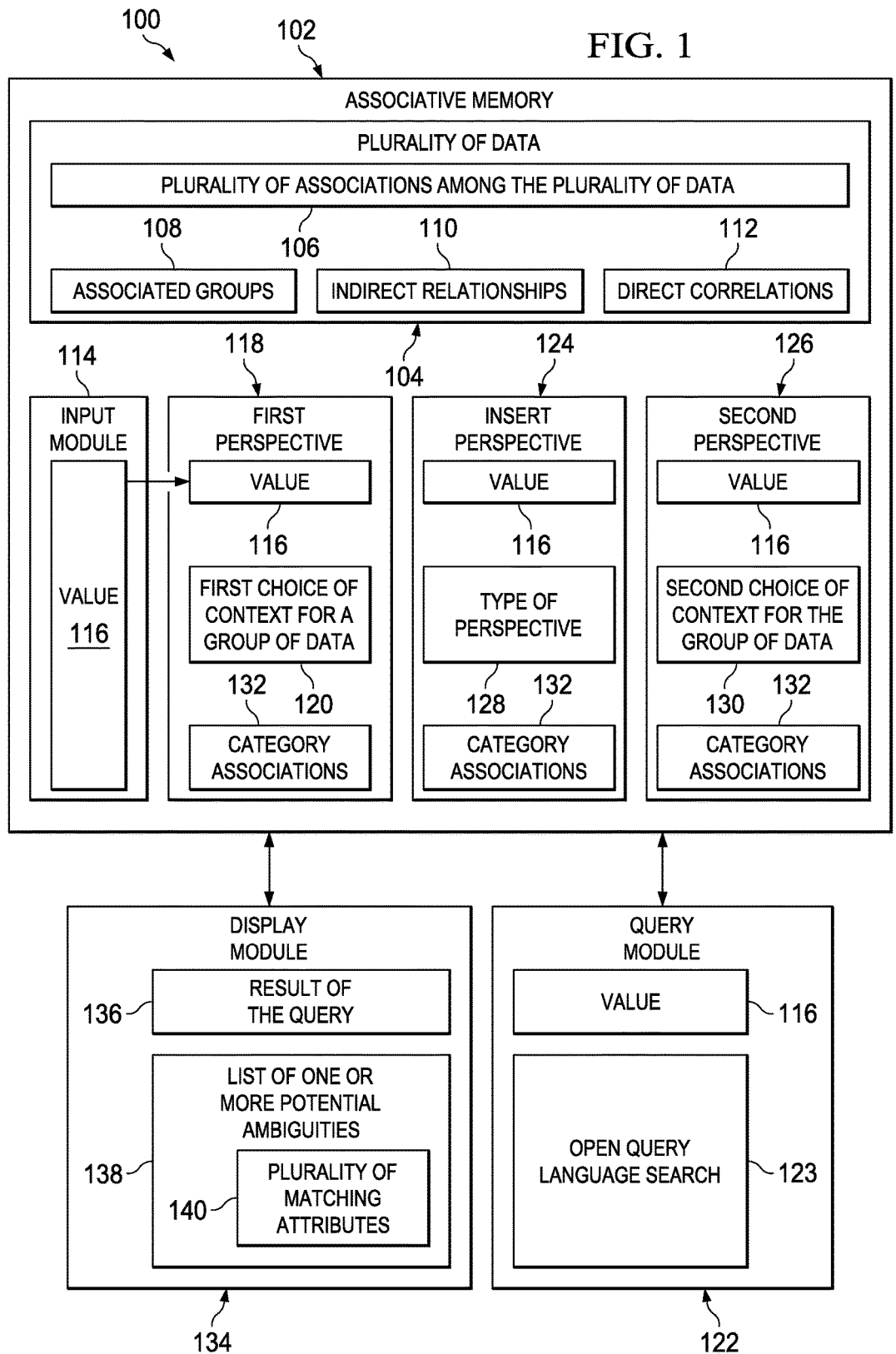
FIG. 1 is a block diagram of a system for finding ambiguities in data in an associative memory, in accordance with an advantageous embodiment.

The advantageous embodiments recognize and take into account that the presence of ambiguous data can lead to errors. Thus, the advantageous embodiments provide a mechanism for a user to quickly identify, evaluate, and resolve ambiguous data with respect to one or more databases. The advantageous embodiments have many other applications.

For example, the advantageous embodiments may take advantage of perspectives or views, including insert perspective, to find effective relationships, such as shown with respect to FIG. 1 through FIG. 16. The advantageous embodiments may be used to uncover ambiguities within an associative memory, such as shown with respect to FIG. 1 through FIG. 5. The advantageous embodiments may be used to present perspective views of results or other data within an associative memory, such as shown with respect to FIG. 6 through FIG. 8. The advantageous embodiments may be used to find and display resource accumulations, such as shown with respect to FIG. 9 and FIG. 10. The advantageous embodiments may describe inserting perspectives of associative memories for quick decision making, as shown with respect to FIG. 11 and FIG. 12. The advantageous embodiments may be used for resolving errors in an associative memory quickly and efficiently, as shown with respect to FIG. 13 and FIG. 14. The advantageous embodiments may be used to display a worksheet view for results derived as a result of querying an associative memory to uncover non-obvious relationships, as shown with respect to FIG. 15.

As used herein the term "associative memory" refers to a plurality of data and plurality of associations among the plurality of data. The data and associations may be stored in a non-transitory computer readable storage medium. The plurality of data may be collected into associated groups. The associative memory may be configured to be queried based on indirect relationships among plurality of data in addition to direct correlations among plurality of data. The associative memory may also be configured to be queried based on direct relationships, and combinations of direct and indirect relationships. Thus, the advantageous embodiments provide for an associative memory comprising a plurality of data and a plurality of associations among the plurality of data. The plurality of data is collected into associated groups. The associative memory is configured to be queried based on at least one relationship, selected from a group that includes direct and indirect relationships, among the plurality of data in addition to direct correlations among the plurality of data. Associative memory may also take the form of software. Thus, associative memory also may be considered a process by which information is collected into associated groups in the interest of gaining new insight based on relationships rather than direct correlation.

As used herein the term "entity" refers to an object that has a distinct, separate existence, though such existence need not be a material existence. Thus, abstractions and legal constructs may be regarded as entities. As used herein, there is no presumption that an entity is animate.

As used herein, a "perspective" may be a "point of view." With respect to an associative memory, a perspective may be a choice of a context for a particular aspect of a user's domain. As used herein, an "insert perspective" is a type of perspective that may be fed back into an associative memory, and which may be viewable from other perspectives as a possible resource.

As used herein a "domain" may be the subject matter at hand for use of analysis.

As used herein the term "ambiguous" may refer to a value or term having several possible meanings or interpretations.

Attention is first turned to finding and/or resolving ambiguous data within an associative memory. The advantageous embodiments provide for using associative memory technology to locate ambiguities by analyzing data through the remembering of entities associated within a domain specific, predetermined perspective. The advantageous embodiments may categorize the results, so the user can quickly determine if the information they are seeking contains ambiguity or not.

As described above, an associative memory may base the results of a query on relationships, associations and frequencies. This property of associative memory may be problematic when the underlining data contains ambiguous information. This issue may be troublesome within large domains. In any case, associative memory technologies all have a difficult time distinguishing between ambiguous data.

As indicated above, ambiguous data may increase the difficulty of accurately determining if one ambiguous value relates to another. In such cases, often the associations created may be erroneous. In turn, erroneous associations may lead to incorrect or confusing results, and may increase the difficulty of performing a desired analysis with the desired level of accuracy.

Currently, determining if data within an associative memory is ambiguous requires a manual investigation initiated by a user's suspicion. A manual investigation may be extremely time consuming and tedious. Manually uncovering if ambiguity exists within large data sets may be difficult. For example, uncovering ambiguous data may require an advanced knowledge of the subject matter to truly determine if particular data is ambiguous. In another example, ambiguity might be uncovered only within a context in which the data is situated. Evaluation of context may require excessive time, may require subject matter expertise, and may be subject to additional error. Yet further, ambiguous data may be present but a user may be unaware that ambiguous data may be present, possibly leading to sub-optimal decision making. Additionally, an ambiguity can take different forms in different contexts. Still further, errors within data formation can be mistaken as an ambiguity, when in actuality an error is present.

The advantageous embodiments recognize these and other issues. The advantageous embodiments may be used to automatically expose the possibility of ambiguities in data, particularly when using an associative memory containing the data. The advantageous embodiments may be used to resolve ambiguities in such data.

The advantageous embodiments also recognize other properties of associative memory, and provide for additional improvements with respect to use of associative memory. Thus, the advantageous embodiments also provide for a perspective view of associative memories. The perspective view allows for organization of associated entities in a way to facilitate quick decision making.

The advantageous embodiments also provide for inserting perspectives of associative memories for quick decision making. Insert perspectives create the ability to insert new unstructured data into an associative memory in order to enable quick decision making. Insert perspectives also may allow the user a mechanism for inserting correct interpretations of data which might otherwise be considered ambiguous. Another advantageous embodiment may provide for resource accumulation of associative memories for quick decision making, by allowing users to focus on the entity with the greatest importance with respect to its accumulation.

Another advantageous embodiment provides for using an associative memory to facilitate a decision based workflow. In this advantageous embodiment, an ability is provided to insert new unstructured data into known associative entities in order to improve their associations, allowing other users to leverage the improved associative memory. This ability also may allow the user a mechanism for inserting correct interpretations of data which might otherwise be considered ambiguous.

Another advantageous embodiment provides for a worksheet view of an associative memory. The worksheet view provides an organization of associated entities used to uncover non-obvious relationships derived from search result-driven analysis.

Another advantageous embodiment provides for use of associative memory technology in intelligence analysis and course of action development. This advantageous embodiment provides for leveraging associative memory technology to rapidly evaluate large volumes of free text data, derive significant knowledge, and present the knowledge in such a way that enables an analyst to develop effective operational plans efficiently.

Other advantageous embodiments are also described herein. Thus, the advantageous embodiments are not limited to the advantageous embodiments described above.

FIG. 1 is a block diagram of a system for finding ambiguities in data in an associative memory, in accordance with an advantageous embodiment. System 100 shown in FIG. 1 may be implemented using one or more data processing systems, possibly in a distributed or networked environment, and possibly by a group of remotely administered data processing systems known as the "cloud." Each of the one or more data processing systems that implement system 100 may be data processing system 1600 described with respect to FIG. 16, or variations thereof. System 100 may be characterized as including one or more modules. Each of these modules may be separate or part of a monolithic architecture. System 100 may take the form of hardware, software, or a combination thereof.

System 100 may include associative memory 102. Associative memory 102 may include plurality of data 104 and plurality of associations among the plurality of data 106. Plurality of data 104 may be collected into associated groups 108. Associative memory 102 may be configured to be queried based on indirect relationships 110 among plurality of data 104 in addition to direct correlations 112 among plurality of data 104.

System 100 may also include input module 114. Input module 114 may be configured to receive value 116 within first perspective 118 of associative memory 102. First perspective 118 may include first choice of context for a group of data 120 within plurality of data 104.

System 100 may also include query module 122. Query module 122 may be configured to perform an open query of associative memory 102 using value 116. The open query may be performed using open query language search 123. Query module 122 may be further configured to perform the open query within at least one of insert perspective 124 and second perspective 126 of associative memory 102. Insert perspective 124 may be a type of perspective 128 which is configured to be fed back into associative memory 102. Second perspective 126 may be a second choice of context for the group of data 130. More or fewer perspectives may be present. At least one of the insert perspective 124 and the second perspective 126 may have as many or more category associations 132 for value 116 relative to first perspective 118.

System 100 may also include display module 134. Display module 134 may be configured to display a result of the query 136. Display module 134 may be further configured to display list of one or more potential ambiguities 138 that result from the open query by query module 122. In an advantageous embodiment, one or more of the potential ambiguities in the list of one or more potential ambiguities 138 may include plurality of matching attributes 140 for value 116.

The advantageous embodiments shown in FIG. 1 are not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 2:
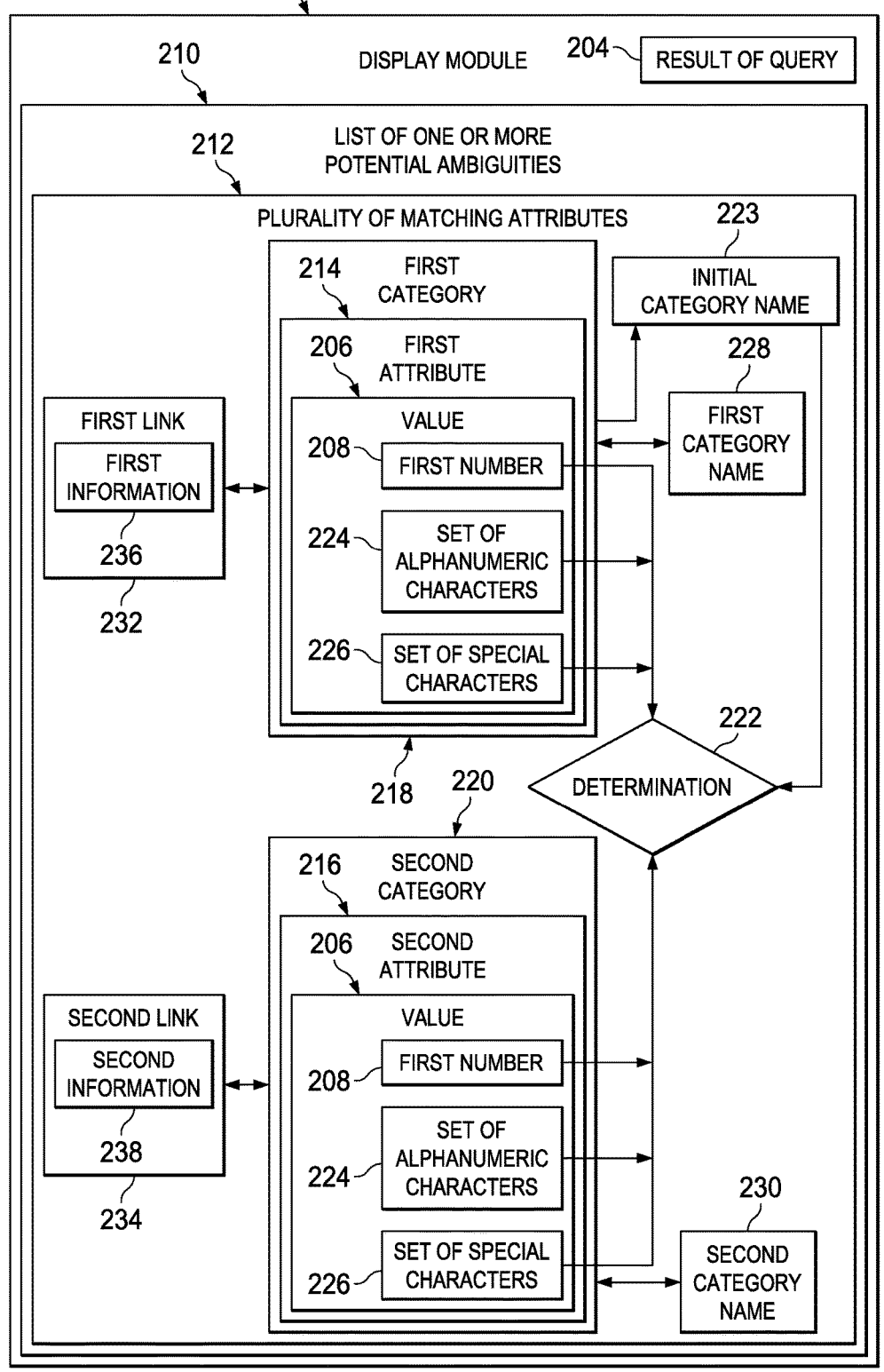
FIG. 2 is a block diagram showing more details of a system for finding ambiguities in data in an associative memory, in accordance with an advantageous embodiment.

FIG. 2 is a block diagram showing more details of a system for finding if ambiguities exist within data in an associative memory, in accordance with an advantageous embodiment. System 200 may show more detail in one or more components of system 100 of FIG. 1. For example, display module 202 of FIG. 2 may be display module 134 in FIG. 1. In another example, result of query 204 in FIG. 2 may be result of query 136 in FIG. 1. Other examples exist with respect to similar terms used in FIG. 1 and FIG. 2. Such similar terms used in FIG. 1 and FIG. 2 may have similar functions and similar properties.

Figure 16:
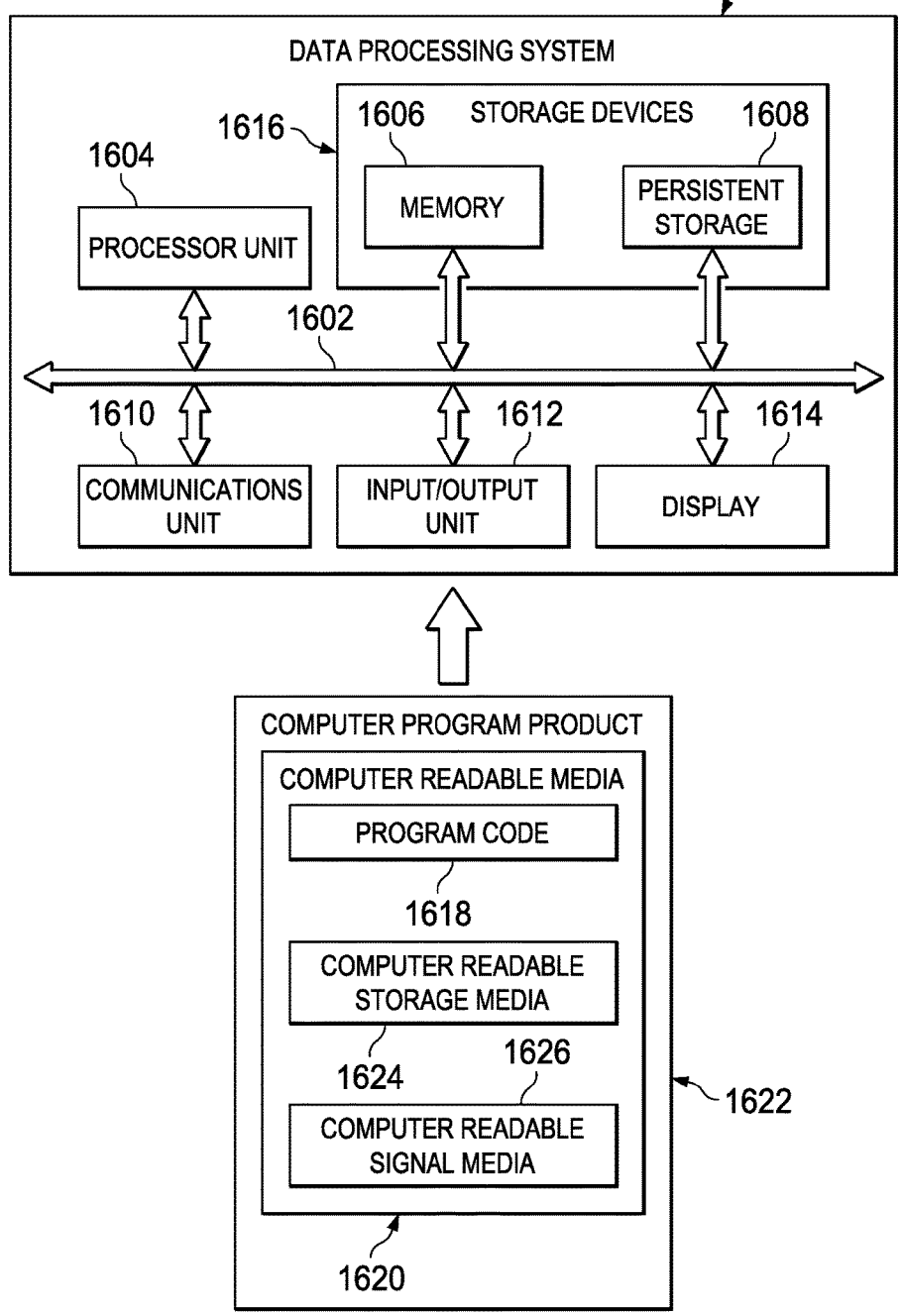
FIG. 16 is an illustration of a data processing system, in accordance with an advantageous embodiment.

System 200 may be implemented using one or more data processing systems, possibly in a distributed or networked environment, and possibly by a group of remotely administered data processing systems known as the "cloud." Each of the one or more data processing systems that implement system 200 may be data processing system 1600 described with respect to FIG. 16, or variations thereof. System 200 may be characterized as including one or more modules. Each of these modules may be separate or part of a monolithic architecture. System 200 may take the form of hardware, software, or a combination thereof.

In an advantageous embodiment, value 206 may be first number 208. List of one or more potential ambiguities 210 may include plurality of matching attributes 212. Plurality of matching attributes 212 may include first attribute 214. First attribute 214 may match value 206. Plurality of matching attributes 212 may also include second attribute 216. Second attribute 216 may also match value 206. First attribute 214 may be a first category 218 associated with first number 208. Second attribute 216 may be a second category 220 associated with first number 208. In an advantageous embodiment, an ambiguity may exist when determination 222 cannot be made whether first number 208 should belong, as perceived by a user or a computer program, to first category 218 or to second category 220 by examining only first number 208.

Determination 222 might not be made, in some instances, because initial category name 223 does not match or is different from first category 218. In this case, an ambiguity in the data may exist or be present. In other words, if the initial category name entered into a perspective is different from or does not match the category of that perspective, then ambiguous data exists or may be present. For example, if an initial category name is "parts", but the first category is "phone number", then ambiguous data exists or may be present.

In an advantageous embodiment, value 206 need not be limited to numbers. For example, value 206 may be at least one of set of alphanumeric characters 224 and set of special characters 226. Special characters within set of special characters 226 may include at least one of a punctuation marks, a symbol, a picture, and a character selected from a language that uses non-alphabetic characters. Examples of characters selected from a language that uses non-alphabetic letters may be Chinese characters, Japanese Kanji characters, and may further include languages that might be characterized as alphabetic in nature but not necessarily alphanumeric, including Hindi, Sanskrit, Korean, Japanese Kana including Hiragana and Katakana, Russian characters, Arabic characters or characters from Arabic-like languages, and any other non-English letters or non-Arabic numerals used in other written languages.

In an advantageous embodiment, display module 202 may be further configured to display first category name 228 for first category 218 and second category name 230 for second category 220. In another advantageous embodiment, display module 202 may be further configured to provide first link 232 associated with first category 218 and second link 234 associated with second category 220. First link 232 may point to first information 236 associated with first category 218. Second link 234 may point to second information 238 associated with second category 220.

The advantageous embodiments shown in FIG. 2 are not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figures 3, 10:
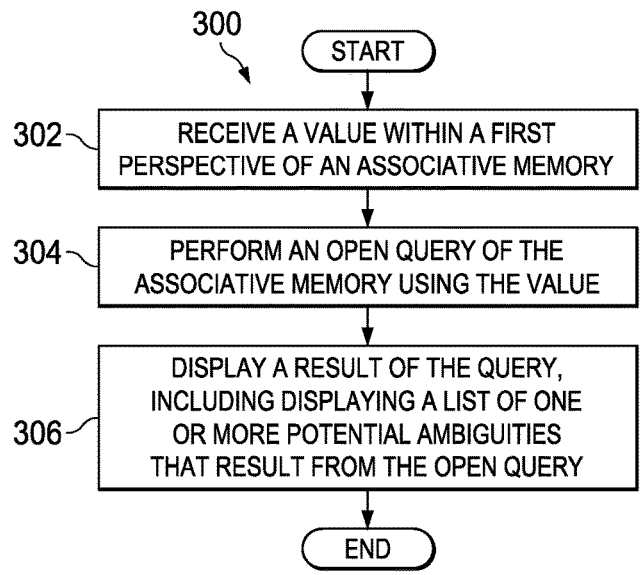
FIG. 3 is a flowchart illustrating a method for finding ambiguities in data in an associative memory, in accordance with an advantageous embodiment.
FIG. 10 is a table illustrating resource accumulation of results found as a result of a query on data in an associative memory, in accordance with an advantageous embodiment.

FIG. 3 is a flowchart illustrating a method for finding ambiguities in data in an associative memory, in accordance with an advantageous embodiment. Process 300 shown in FIG. 3 may be implemented in a module, system, or data processing system, such as system 100 of FIG. 1, system 200 of FIG. 2, or data processing system 1600 of FIG. 16. Process 300 described with respect to FIG. 3 may be implemented in the form of a non-transitory computer readable storage medium storing computer readable code which, when implemented by a processor, may execute the method described with respect to FIG. 3. While the operations of FIG. 3 are described as being implemented by a "system," process 300 is not limited to being implemented by the systems of FIG. 1 and FIG. 2, but also may be implemented by one or more real or virtual data processing systems, possibly in a distributed or networked environment. Process 300 may be implemented using hardware, software, or a combination thereof.

In an advantageous embodiment, process 300 begins by the system receiving a value within a first perspective of an associative memory (operation 302). In an advantageous embodiment, the first perspective may be a first choice of context for a group of data within the plurality of data. The associative memory may be a plurality of data and a plurality of associations among the plurality of data. The plurality of data may be collected into associated groups. The associative memory is configured to be queried based on indirect relationships among the plurality of data in addition to direct correlations among the plurality of data.

Returning to process 300, next the system may perform an open query of the associative memory using the value (operation 304). In an advantageous embodiment, the open query may be performed within at least one of an insert perspective and a second perspective of the associative memory. The insert perspective may be a type of perspective which is configured to be fed back into the associative memory. The second perspective may be a second choice of context for the group of data. At least one of the insert perspective and the second perspective may have more category associations for the value than the first perspective.

Returning to process 300, the system may display a result of the query, including displaying a list of one or more potential ambiguities that result from the open query (operation 306). The one or more potential ambiguities may include a plurality of matching attributes for the value.

Process 300 may be varied from the operations described above, and additional details may be present within any given operation. For example, the value may be a first number and the plurality of matching attributes may be a first attribute that matches the value and a second attribute that matches the value. The first attribute may be a first category associated with the first number. The second attribute may be a second category associated with the first number. In an advantageous embodiment, a determination cannot be made by examining only the first number whether the first number should belong, as perceived by a user or a computer program, to the first category or to the second category. This determination might not be made, in some instances, because the value or data does not match the initial category type of the initial query, which might be an entry in first perspective 118 of FIG. 1.

In another advantageous embodiment, the value may include at least one of a set of alphanumeric characters and a set of special characters. The special characters may include at least one of a punctuation mark, a symbol, a picture, and a character selected from a language that uses non-alphabetic characters.

In an advantageous embodiment, displaying may further include displaying a first category name for the first category and a second category name for the second category. In an advantageous embodiment, displaying may include providing a first link associated with the first category and a second link associated with the second category. The first link may point to first information associated with the first category, and the second link may point to second information associated with the second category. In another advantageous embodiment, performing the open query may include performing the open query using an open attribute query language search.

The advantageous embodiments shown in FIG. 3 are not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 4:
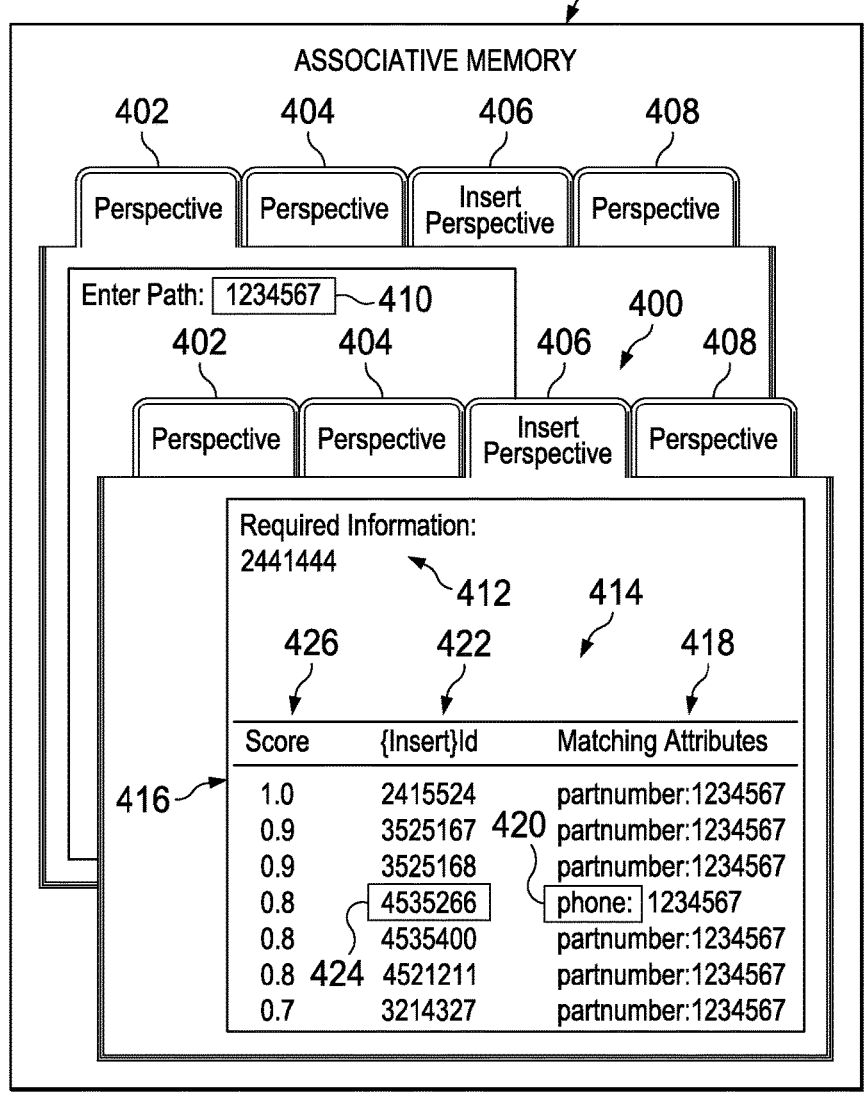
FIG. 4 is a drawing showing an exemplary software system in use exposing an ambiguity in data in an associative memory, in accordance with an advantageous embodiment.

FIG. 4 is drawing showing an exemplary software system in use exposing an ambiguity in data in an associative memory, in accordance with an advantageous embodiment. Drawing 400 is exemplary only, as the advantageous embodiments may take many different forms and may be displayed in many different ways. Thus, drawing 400 is not limiting of the claimed inventions. Drawing 400 may be displayed as a result of the methods and techniques described with respect to FIG. 1 through FIG. 3. Drawing 400 may be displayed by using data processing system 1600 or by one or more other data processing systems. As used herein, the advantageous embodiments describe a "system" as performing one or more operations. The "system" may be one or more data processing systems, possibly operating in a distributed or networked environment.

Drawing 400 shows a number of perspectives, including part number perspective 402, perspective 404, insert perspective 406, and perspective 408. As defined above, a "perspective" may be a "point of view." Each associative memory may have one or more perspectives. Drawing 400 may illustrate an associate memory 409 with four perspectives, perspective 402, perspective 404, insert perspective 406, and perspective 408. Perspective 402 may be a part number perspective. More or fewer perspectives may be present, and different kinds of perspectives may be present with many different values or arrangements relative to those shown in FIG. 4. Each associative memory may have a perspective that enables the insertion of entities. For example, a "problems" perspective or a "complaints" perspective would be a means to insert problem or complaint data into an associative memory. Thus, with respect to associative memory 409, a perspective may be a choice of a context for a particular aspect of a user's domain. As described above, an "insert perspective" is a type of perspective that may be fed back into associative memory 409.

In a particular advantageous embodiment, not limiting of the claimed inventions, perspective 402 may be a particular part number, such as value 410. Although value 410 is shown in FIG. 4, value 410 may take the form of any value and may be a string of alphanumeric characters or any other symbols, such as those described above with respect to FIG. 1. Furthermore, value 410 might be associated with different categories, other than a part, and may be associated with multiple categories or other corresponding perspectives, such as perspective 404, insert perspective 406, and/or perspective 408.

In an advantageous embodiment, a user or a computer program may enter value 410 within perspective 402. In this particular advantageous embodiment, which is not limiting on the disclosures or claims, value 410 may be a part number. In this advantageous embodiment, a user may preselect the category associated with the value of value 410 by entering value 410 within perspective 402. The user in this particular advantageous embodiment may not realize that the data he or she is investigating may be ambiguous. The user may wish to gain a better understanding of value 410. In other advantageous embodiments the user may be able to use this information to resolve ambiguities created by the possibility that value 410 may be associated with other categories within associative memory 409.

After receiving value 410, the system may use insert perspective 406, as shown at required information 412 of worksheet 414. Another example of a worksheet may be seen with respect to FIG. 15. Then, the system may perform a query of associative memory 409 within the required information 412. The query, in one advantageous embodiment, may be performed using an attribute query language and may be performed using an open query.

Thus, to identify ambiguous data, the system may perform a lookup on a desired value, such as required information 412, within insert perspective 406. The lookup may work regardless of what the result category is, as long as the entity can be found. Therefore, in a particular non-limiting advantageous embodiment, the most dependable method may be to use insert perspective 406 as the result category, since insert perspective 406 may act as a catalyst to all of the other perspectives. In this manner, it is possible to identify all ambiguous data within the domain.

The system then may return all instances of required information 412, as shown at table 416 within worksheet 414. Required information 412 may be, in an advantageous embodiment, value 410. These instances in table 416 may be a result of matching the value of required information 412, which again may be a part number, with other instances of required information 412 found within associative memory 409. The returned values may be used to identify ambiguity with regard to perspective 402 of required information 412.

Ambiguous data may be displayed in the form of multiple matching attributes of the result set where the category type of the results do not match a perspective type of the initial query. For example, one category type of the results may be "partnumber", as shown in matching attributes column 418 of FIG. 4, which matches the category type of the initial query established by entering value 410 in perspective 402. However, another category type of the results may be "phone", as shown in matching attributes column 418 of FIG. 4. The category type "phone" does not match the category type "partnumber"; therefore, multiple matching attributes of the result set are present where the category type of the results does not match a perspective type of the initial query. Accordingly, the value "1234567" may represent ambiguous data within associative memory 409.

For example, within table 416, matching attributes column 418 may show a category associated with value 410, along with the value of value 410 itself, with the category and value separated by a colon in this particular advantageous embodiment. The category value of the matching attributes of each result may help a user identify ambiguity data. Thus, by looking at a corresponding value, the user can determine if the data is relevant and/or ambiguous. For example, the user may now know that value 410 entered in perspective 402 may represent ambiguous data, in the sense that the value may be related to two different categories. In this example, the value is related to both a part number (the first category) and a phone number (the second category). Thus, the fact that a phone number displays among parts means that value 410 is ambiguous.

In this particular advantageous embodiment, phone number 420 may be considered ambiguous data because the value for value 410 also matches the value for phone number 420. In other words, the value "1234567" matches two categories simultaneously, both value 410 and phone number 420, and thus the value "1234567" may be ambiguous. As a result, had user not known of this ambiguity, performing some other search or operation with respect to associative memory 409 using this value may have produced an erroneous or undesirable result. Using the advantageous embodiments, the user or a computer program programmed to use the advantageous embodiments, may now know that the value for value 410 may be ambiguous with respect to the value for phone number 420. The user or the computer program may now take appropriate action to either resolve the ambiguity or take the ambiguous data into consideration when performing some other action with respect to associative memory 409.

The system may be provided with additional functionality. For example, the system may be configured to display a source of ambiguous data. As shown in FIG. 4, the source of any given matching attribute or category and corresponding value may be displayed in "{Insert}ID" column 422. In particular, for example, source ID 424 may indicate a location or other lookup value for a source document where the value "1234567" is associated with the category or attribute "phone." Likewise, the user or a computer program may use other entries in "{Insert}ID" column 422 to look up corresponding sources where the corresponding matching attribute and value are referenced.

In an advantageous embodiment, the entries within "{Insert}ID" column 422 may be provided with links, hyperlinks, or other pointers to the referenced source. Thus, in an advantageous embodiment, the user may select the source of the ambiguous data in order to see the original context of the ambiguous data. For example, a user or computer program may use a link, such as by "clicking" on source ID 424, in order to display the source material where the value "1234567" is associated with a phone number. Accordingly, the user may determine the ambiguity involved and may take other action to resolve or appropriately deal with the ambiguous data.

Optionally, the system may be configured to display still further information. For example, the system may display score column 426. Entries within score column 426 may indicate to a user or computer program an estimated relevance of the entered value with respect to the perspective in which the value was entered. Thus, for example, a relevance score may be assigned to a particular matching attribute or category according to value 410 entered within perspective 402.

The system may be configured to display still further information. Thus, the advantageous embodiments are not limited to the drawings shown in FIG. 4.

Stated differently, the system used with respect to FIG. 4 may perform an open attribute query language search on a desired value with the value's perspective as the value's result category. Then, the system may display the category value of the matching attributes from its result set. The system may use the category value to show the ambiguity with regards to the sought value. If the resulting category value of the matching attributes does not match the category of the sought value, then that data is ambiguous. The system also may allow the user to see some or all of the categories associated with value 410. This ability can be helpful in determining why the data is ambiguous and if the ambiguous data ought to be corrected or other appropriate action taken.

The advantageous embodiments have several advantages. For example, the advantageous embodiments may not require an advanced knowledge of the subject matter to determine if the data is ambiguous. Instead, the system may determine this fact and provide or display simple categorized results that allow an understanding of how the data might be interpreted as ambiguous.

In another example, the advantageous embodiments may not require the user to uncover the context behind the data in order to discover ambiguity in the data. Instead, the system may perform this task by using an associative memory lookup within a predetermined perspective. This lookup may automatically take into account different forms and different contexts, and may provide the user with the correct results.

In another example, the advantageous embodiments may help identify and correct errors within the data that might otherwise be mistaken as ambiguity. For example, a user may update underlying data identified as being ambiguous so that the data is no longer ambiguous.

In another example, the advantageous embodiments may allow users to make quick informed decisions while reducing the worry of introducing data obfuscation caused by any ambiguity within a given domain. The advantageous embodiments may organize the data in a manner that allows the user not only to locate possible ambiguities, but to correct or address ambiguous data as well. The advantageous embodiments condense and summarize potentially ambiguous data, so that the user may view only one screen rather than multiple pages of data.

The advantageous embodiments may avoid the clutter that typically results when searching for ambiguity. Instead, the advantageous embodiments may provide results focused solely on the problem at hand. The advantageous embodiments may reduce large amounts of data to simple categories and values. This feature may save a great deal of time when a user has been tasked to explore large data sets.

The advantageous embodiments may allow a user to quickly uncover the ambiguous data within their result set. The advantageous embodiments provide the search value in the results uncovered.

The advantageous embodiments may also address ambiguous data as a predetermined perspective chosen by the user. The advantageous embodiments may display only the results deemed essential to the user's request. The advantageous embodiments may provide a quick mechanism to obtain information used to make quick decisions. The advantageous embodiments need not be domain specific. The advantageous embodiments may be platform independent and portable.

The advantageous embodiments may increase reliability through more complete data analysis through the discovery and subsequent elimination of ambiguous data. The advantageous embodiments may increase portability through flexible deployment of the system. The advantageous embodiments may provide increased information accessibility with data organized from a user's perspective. The advantageous embodiments may provide for better use of resources, as multiple associative memory tasks may be completed at one time. The advantageous embodiments may increase performance through greater efficacies, such as by showing only data deemed necessary or only particular types of data, categories of data, or some other organizational principle. The advantageous embodiments may have other advantages, as well.

Figure 5:
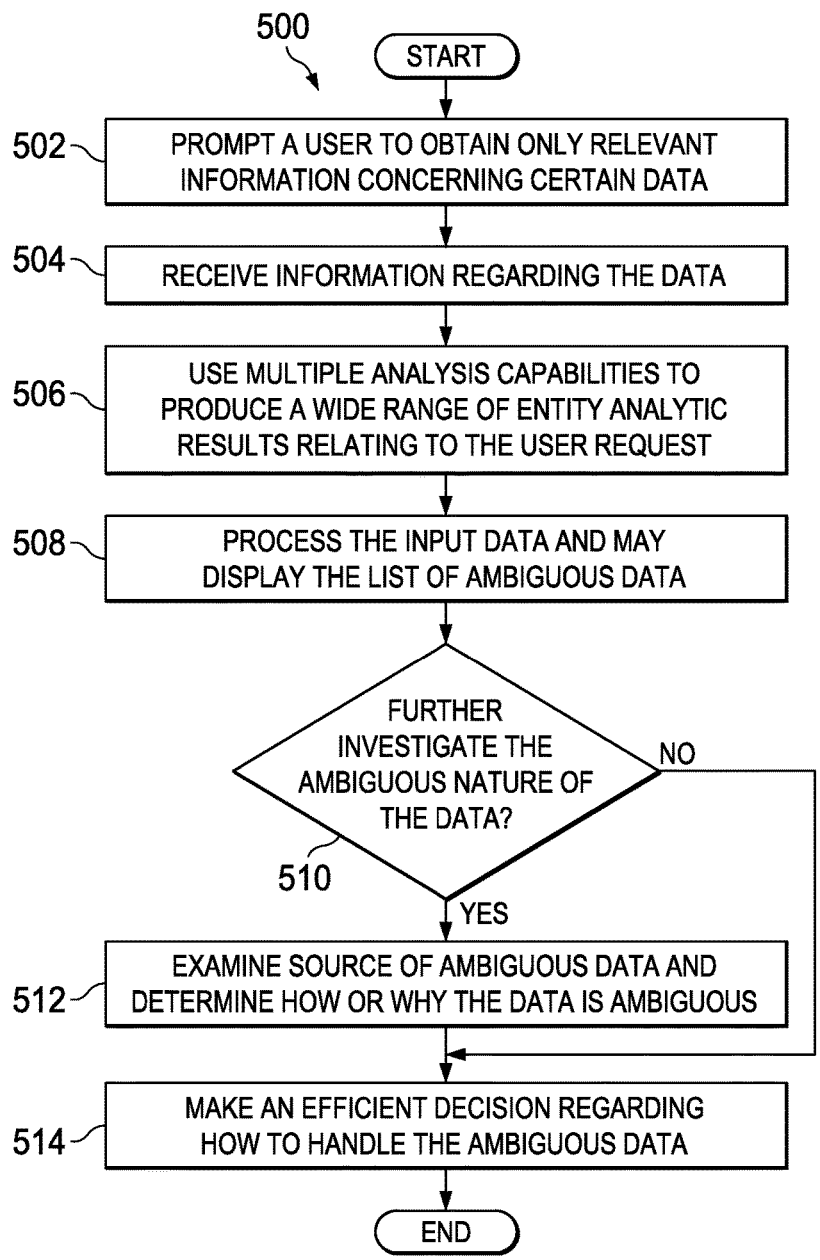
FIG. 5 is a flowchart illustrating a method for finding ambiguities in data in an associative memory, in accordance with an advantageous embodiment.

FIG. 5 is a flowchart illustrating a method for finding ambiguities in data in an associative memory, in accordance with an advantageous embodiment. Process 500 may be an alternative to process 300 of FIG. 3. Process 500 shown in FIG. 5 may be implemented in a module, system, or data processing system, such as system 100 of FIG. 1, system 200 of FIG. 2, or data processing system 1600 of FIG. 16. Process 500 described with respect to FIG. 5 may be implemented in the form of a non-transitory computer readable storage medium storing computer readable code which, when implemented by a processor, may execute the method described with respect to FIG. 5. While the operations of FIG. 5 are described as being implemented by a "system," process 500 is not limited to being implemented by the systems of FIG. 1 and FIG. 2, but also may be implemented by one or more real or virtual data processing systems, possibly in a distributed or networked environment. Process 500 may be implemented using hardware, software, or a combination thereof.

In an advantageous embodiment, process 500 begins by the system prompting a user to obtain only relevant information concerning certain data (operation 502). In order to achieve this goal, the user may desire or need to locate some or all ambiguities within the results of a search related to the data.

Next, the system may receive information regarding the data (operation 504). The system may receive this information from the user, or possibly from another computer program. For example, the user may input a value for a part number in order to identify ambiguities associated with that value.

Next, the system may use multiple analysis capabilities to produce a wide range of entity analytic results relating to the user request (operation 506). The system may then process the input data and may display the list of ambiguous data (operation 508). The system may clearly identify each entity by showing the category and value of the matching attributes for value 502. The system may consider matching attribute values that span multiple categories to be ambiguous, as shown in FIG. 4.

Next, the system may prompt a user to decide whether to further investigate the ambiguous nature of the data (operation 510). If further investigation is decided, then the user or computer program may examine the source of ambiguous data to determine how or why the data is ambiguous (operation 512). As a result, the user or computer program may determine the ambiguity at hand.

Subsequently, or in response to a determination not to further investigate the ambiguous nature of the data in operation 510, the user or a computer program may make an efficient decision regarding how to handle the ambiguous data (operation 514). The process may terminate thereafter. The user or computer program can thus focus on relevant knowledge needed to complete a task at hand.

The advantageous embodiments shown in FIG. 5 are not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 6:
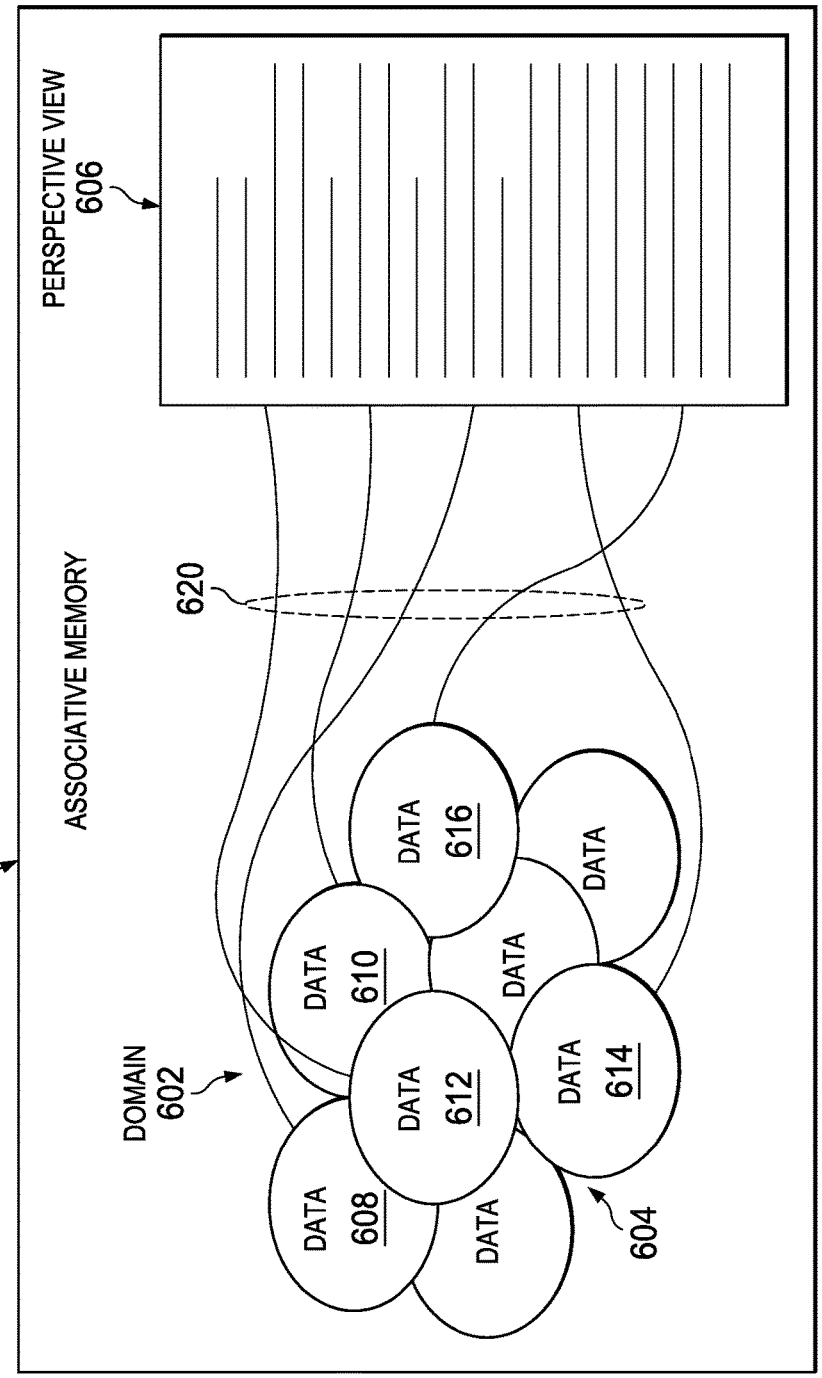
FIG. 6 is a drawing illustrating a relationship between a domain of data and a perspective view, in accordance with an advantageous embodiment.

FIG. 6 is drawing illustrating a relationship between a domain of data and a perspective view, in accordance with an advantageous embodiment. The drawing of FIG. 6 may be implemented using associative memory 600, which may be associative memory 102 of FIG. 1. A perspective is as described with respect to FIG. 1 and FIG. 4.

Domain 602 may contain various disparate data 604 within associative memory 600. FIG. 6 illustrates how disparate data 604 may be organized into perspective view 606. For example, among all of disparate data 604, certain data elements may be organized into perspective view 606. Perspective view 606 may be perspective view 700 of FIG. 7. For example, data elements 608, 610, 612, 614, and 616 may be organized into perspective view 606, as shown by lead lines 620.

The advantageous embodiments may use associative memory technology coupled with a custom user interface to enable quick decision making from result-driven analysis through the remembering of entities associated with a domain specific, predetermined perspective. The advantageous embodiments may organize the results in an efficient manner that helps users discover relationships and associations within that perspective in order to make quick decisions.

Attention is now turned to issues that make desirable an improved presentation of an associative memory query result. When faced with making quick decisions, analysts may desire to quickly uncover specific information among large data sets. This specific information preferably may be presented in a way that eliminates time used unnecessarily on details considered superfluous, while allowing the analyst to focus on only the data elements deemed needed or desired for accurate decision-making.

Focusing an analysis using associative memory technology may be difficult due to a possibly overwhelming number of results that may be uncovered using an associative memory. Associative memory technology may work with large amounts of data and thereby create problems for users when attempting to navigate a result set of a given domain, especially when forced to make quick decisions. Associative memory technology may base its results on relationships, associations and frequencies, which may be confusing when attempting to find quick answers to particular problems within a large domain.

Thus, the results given from using an associative memory technology can cloud a user's investigation with data the user may consider superfluous. For example, when searching for a particular part, a user may be overwhelmed with data from operators, models, service requests, maintenance data, and customer messages. These distractions can cause the user to lose sight of the original task or problem to be solved. The ability to keep centered on the problem at hand may be very difficult, especially when the associative memory technology provides so much data with countless navigation possibilities. These aspects of associative memories may deter quick decision making.

Nevertheless, associative memory technology may encapsulate multiple analysis capabilities to aid users. Multiple analysis capabilities may include collecting attributes, associations, and similarities among data. Each capability may take form as separate result sets, which may make it difficult for the user to compare values among the result sets. Some results may span different categories and may lead the user away from their initial problem set. In addition, many of these results may take a significant amount of time and effort to uncover, because the results may include a combination of tasks. As a result, associative memory technology may be considered a poor tool with respect to quick decision making, especially when dealing with large data sets where a user can get lost and bewildered by results generated by the associative memory.

Two possible approaches to these issues may include use of a Web search tool and use of a complex intelligence tool. With respect to a Web search tool to search requested information, this type of search may return references to documents containing information on the requested information. However, many false positives and false negatives may result, and information may not be displayed in a useful fashion. In turn, complex intelligence tools may require an expert to analyze the results in which the time line can vary.

In either case, solving these types of problems previously involved a lengthy, manual process. The user may have to find a way through the data without losing sight of the initial request. In some cases, this process might require the use of additional software. For example, users might employ an external tool or application and copy the results into it. In any case, neither the use of a Web search tool or a complex intelligence tool would be useful.

Another way of navigating results is to simplify the results. Simplification could include narrowing the user's domain until the domain is essentially the same as the user selected perspective. Subsequently, a user could also widen their perspective until the perspective equals the domain. Either one of these procedures may cause the user to modify their search, which most users may prefer not to do.

Figure 7:
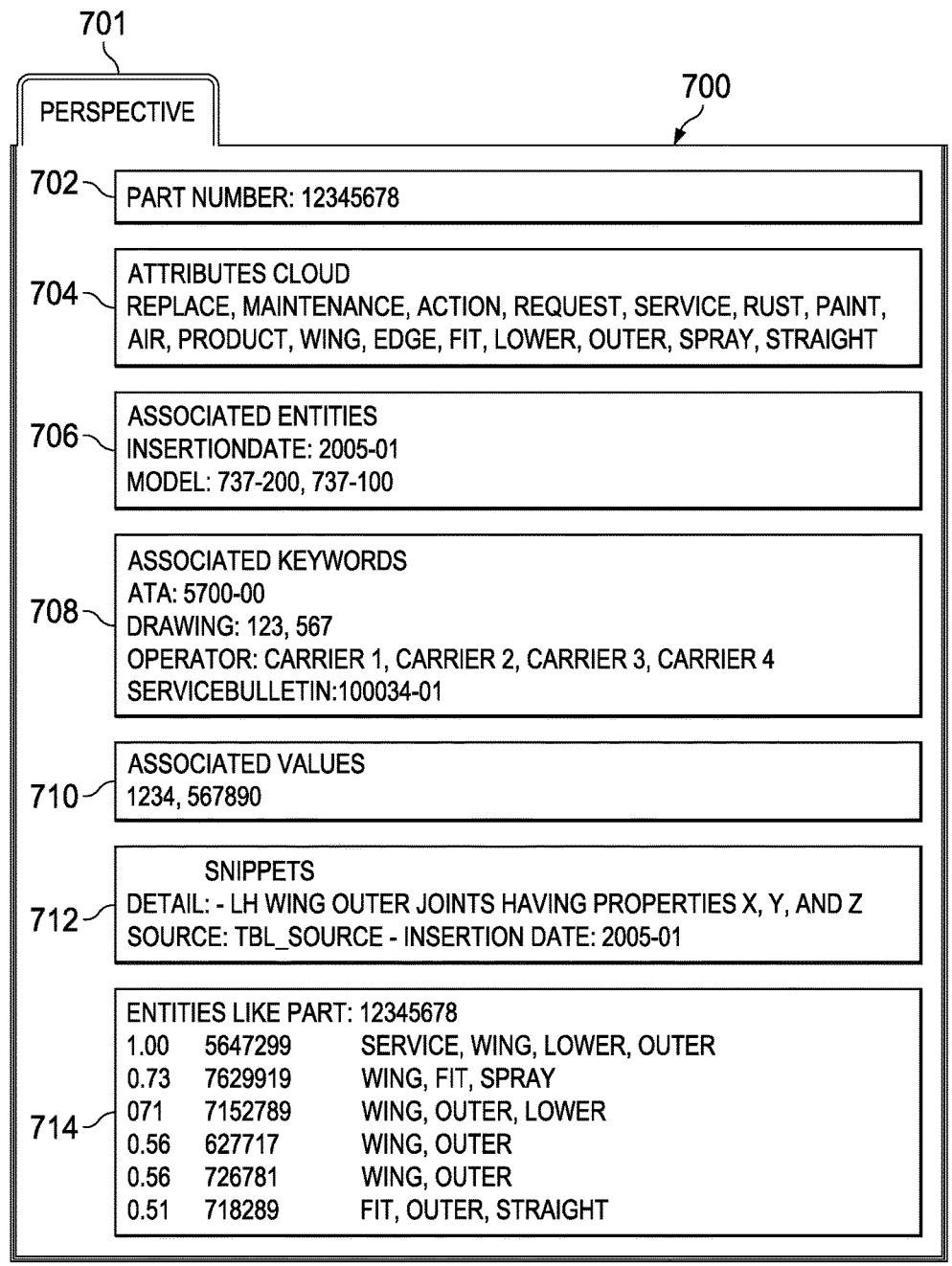
FIG. 7 is an exemplary perspective view of a result of a search of an associative memory, in accordance with an advantageous embodiment.

FIG. 7 is an exemplary perspective view of a result of a search of an associative memory, in accordance with an advantageous embodiment. The advantageous embodiment of FIG. 7 may represent a screenshot displayed as a result of such a search. Perspective view 700 may be a result of a search or query conducted according to the techniques described with respect to FIG. 1 through FIG. 6. Perspective view 700 may be associative memory 600 of FIG. 6. Perspective view 700 need not be limited to displaying results of queries or searches performed using an associative memory, but may also be used to display the results of queries or searches performed using Web search engines and/or complex intelligence tools. The advantageous embodiments may allow users to focus on key information in order to make informed decisions quickly. Perspective 701 may be a perspective, such as perspective 402 of FIG. 4. Perspective 701 may be a parts perspective, as shown, but may be any perspective and is not limited to the advantageous embodiments shown in FIG. 7.

Perspective view 700 may be logically separated into different sections, separated by lines or any other convenient section designation system. Each section displays certain information. The sections may be arranged to aid a user to more quickly find relevant information. The sections shown in FIG. 7 are exemplary only, and may be varied. For example, the sections shown in FIG. 7 need not be one section stacked on another, as shown, but could be arranged in different patterns and may be bounded by different shapes, colors, or other distinguishing characteristics.

In the advantageous embodiments shown in FIG. 7, seven sections are shown, stacked one on top of the other. However, as described above, this arrangement may be varied.

In an advantageous embodiment, section 702 may display an initial entity category and the value that was searched. In a non-limiting example, section 702 could display the entity category along with its value. In this advantageous embodiment the entity category may be "part number" and the value may be "12345678". A user may provide this value in order to gain a better understanding of the subject matter at hand. The user may preselect the entity category, or perspective, associated with this value. As long as the user stays within this perspective, all the results will take that category's form.

In an advantageous embodiment, section 704 may display attribute cloud values of the value sought in section 702. Attribute cloud values may be broad categories or values associated with the sought value. Attribute cloud values may provide a quick summary by supplying a list of important words accumulated during the search relating to the value sought in section 702.

In an advantageous embodiment, section 706 may display associated entity values of the sought value in section 702. These entity values may be additional entities associated with the sought value in section 702. These entity values may be similar to the attributes above, except they may carry more weight as entities, as their category type may be defined by the user. In addition, these entity types could also be defined as perspectives, if the user deemed them as being perspectives. The user may search some or all of these values as well.

In an advantageous embodiment, section 708 may display keyword values associated with the sought value in section 702. The values may be similar to the attributes above in section 704, except these values may carry more weight as keywords, but less weight than entities. These values in section 704 may have been identified by the users as relevant but not as perspectives. In some advantageous embodiments, the user cannot search these values.

In an advantageous embodiment, section 710 may display one or more values of one or more entity categories associated with the sought value in section 702. These values in section 710 may be entities associated with the sought value, and may share the same category value. The values in section 710 may be similar to the attributes above in section 704, except the values in section 710 may carry more weight as entities and/or a perspective. In an advantageous embodiment, the user may search these values as well.

In an advantageous embodiment, section 712 may display snippets. Snippets may be portions of text or graphics of content related to the sought value in section 702. Thus, section 712 may provide the user with a snapshot of the resources pertaining to the sought value. Preferably, section 712 may show a brief fragment of the underlying source data, solely to show the user where the data initially came from. However, section 712 may show additional underlying data, even complete underlying data. Section 712 might in some instances be expandable or contractible to show more or less underlying data.

In an advantageous embodiment, section 714 may display other entity values that may be like the sought value shown in section 702. Thus, the values displayed in section 714 may share the same attributes as the sought value. This feature gives the user the ability to quickly locate values just like the one sought. The system may rank and order these values in section 714 by similarity, or by some other organization scheme, possibly placing the item most similar to the sought value in section 702 at the top of section 714.

Section 714 may display the matching attributes which the common entities share. However, section 714 may show additional data to help guide the user to make better informed decisions. For example, in an advantageous embodiment, the system may display the price of a part, so that a user could select the least expensive alternative among similar entities.

In summary, in some cases it may be important to categorize results when searching vast amounts of data, especially when using associative memory learning agent technology. The results gathered from this technology can be very difficult to manage and navigate. The advantageous embodiments may focus on the user perspective to help a user or a querying computer program to obtain the most out of associative memory technology. The advantageous embodiments may organize the data into a well thought-out interface that may provide the most useful data that the user may desire to review. The advantageous embodiments may show more or fewer data.

The advantageous embodiments also may capture entity analytics from the perspective that is most valuable to the end user. The advantageous embodiments may organize the data so a user can explore the result set without deviating from an initial query. The advantageous embodiments may perform multiple entity analytic tasks and displays all of the results all at once within a perspective that may be most valuable to the end user. The advantageous embodiments may keep the results centered on the initial category of the sought value. This feature may allow the user to rapidly navigate among the returned information.

Thus, the advantageous embodiments provide users with a quick mechanism to obtain a summary of information all at once. The advantageous embodiments may display only key and important words in an intuitive manner. The advantageous embodiments may place the most useful data first, allowing users to gain knowledge before reading through any material. The advantageous embodiments may provide a great advantage when faced with large amounts of data.

Because the advantageous embodiments may display syntax that is commonly used, a user can peruse through data without having to fully understand that data. The advantageous embodiments may display nouns, verbs, adjectives, and adverbs, or possibly pictures, symbols, video, or audio. In this manner, the advantageous embodiments may allow a user to quickly grasp the general concept behind the information being sought.

Web search engines do not possess these capabilities. Results returned by Web search engines usually include documents, or large portions of text that have to be analyzed. To obtain the type of results needed to make accurate decisions, an analyst would have to spend a great deal of time reading and understanding the material. This process would not be very effective for quick decision-making. Additionally, Web search engines have limited searching capabilities. Web search engines may perform static-like searches and are not capable of producing results like the ones found from entity rich associations found in associative memory technologies.

Likewise, complex intelligence tools do not possess the capabilities of the advantageous embodiments. The results derived from these types of tools may require a great deal of analysis and time as too much data is returned. Complex intelligence tools also typically require a subject matter expert to be able to use the tools.

Thus, both Web-based searches and complex intelligence tools may involve a number of manual steps to reproduce the results gathered using the advantageous embodiments. Manual steps or analysis is usually cumbersome, distracting, and time consuming, as well as error prone. Manual analysis may be fraught with the possibility of navigating further away from the user's initial request, and going in a direction that is astray from original user intent.

Additionally, the advantageous embodiments may avoid the clutter that may result from typical entity analytic queries. Thus, the advantageous embodiments may provide results within a single perspective pre-selected by the user. This feature may cause the results to focus solely on the problem at hand. As a result, the advantageous embodiments may reduce large amounts of data to simple words and search terms. This feature may save a great deal of time when exploring large data sets.

The advantageous embodiments may provide a quick mechanism to obtain key and important information used to make quick decisions. The advantageous embodiments may perform multiple entity analytic tasks and display all of the results in one location on the screen. The advantageous embodiments may provide a well thought out interface that is easy to navigate.

The advantageous embodiments need not be domain specific. The advantageous embodiments may be platform independent and portable. The advantageous embodiments may be flexible in that the advantageous embodiments may allow users to add and remove perspectives, as well as logical units.

Thus, the advantageous embodiments may allow users to make quick, informed decisions without having to analyze an undesirable amount of data. The advantageous embodiments may organize the data to provide the most important information first. This information may be condensed and summarized so that the information only requires the user to read a few words rather than multiple pages.

The advantageous embodiments may also be a tool for training individuals. The advantageous embodiments may allow trainees to focus only on the key information needed to perform their individual tasks. The advantageous embodiments may generalize an undesirable amount of data into comprehensible words, thereby shortening the time spent needed for training.

Unlike other entity-based search tools, the advantageous embodiments provide a high degree of flexibility. The advantageous embodiments may be suited to any domain that utilizes entity analytics. Once a domain is chosen, a user may select any perspective to explore within that domain. Users may add and remove perspectives as well as logical units. This feature also allows the advantageous embodiments to be rapidly deployable.

Figure 8:
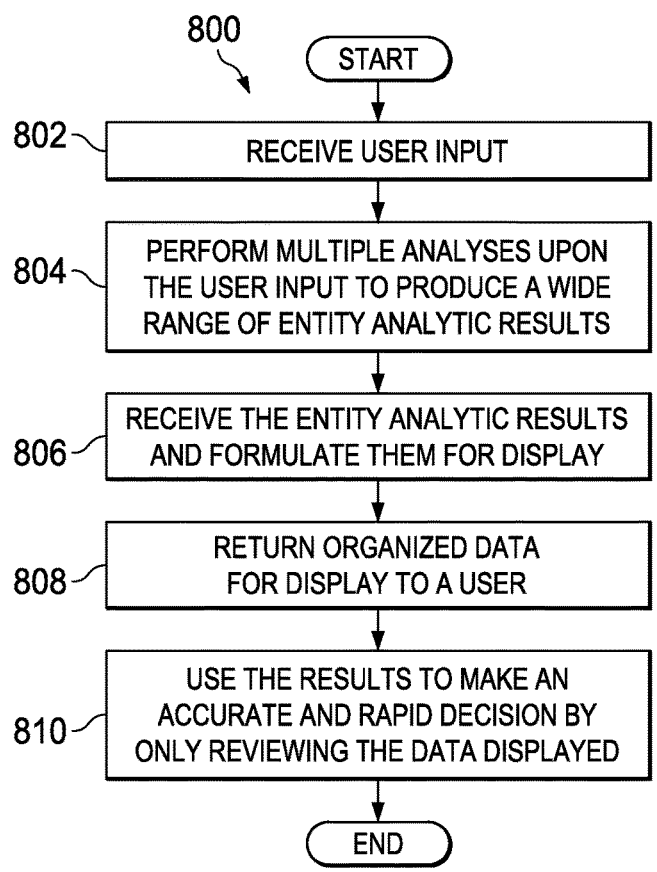
FIG. 8 is a flowchart illustrating a process of displaying a perspective view of an associative memory search result, in accordance with an advantageous embodiment.

FIG. 8 is a flowchart illustrating a process of displaying a perspective view of an associative memory search result, in accordance with an advantageous embodiment. Process 800 shown in FIG. 8 may be implemented in a module, system, or data processing system, such as system 100 of FIG. 1, system 200 of FIG. 2, or data processing system 1600 of FIG. 16. Process 800 described with respect to FIG. 8 may be implemented in the form of a non-transitory computer readable storage medium storing computer readable code which, when implemented by a processor, may execute the method described with respect to FIG. 8. While the operations of FIG. 8 are described as being implemented by a "system," process 800 is not limited to being implemented by the systems of FIG. 1 and FIG. 2, but also may be implemented by one or more real or virtual data processing systems, possibly in a distributed or networked environment. Process 800 may be implemented using hardware, software, or a combination thereof.

Process 800 may begin by receiving user input (operation 802). The input received from the user may be within a preselected perspective. In an advantageous embodiment, the user may have been tasked to obtain specific knowledge within a large domain of information within a preselected perspective. The user may input a specific information request in order to gain a better understanding of the subject matter at hand. For example, the user may have been tasked to obtain knowledge about a part number, where "partnumber" is the preselected perspective. Thus, as part of receiving user input the user may input the part number.

Next, the associative memory may perform multiple analyses upon the user input to produce a wide range of entity analytic results (operation 804). The system may then receive the entity analytic results and formulate them for display (operation 806). As part of formulating the entity analytic results, the system may organize the entity analytic results as described above to aid the user to make decisions quickly and accurately.

Next, the system may return organized data for display to a user (operation 808). In an advantageous embodiment, the user or another computer program may use the results to make an accurate and rapid decision by only reviewing the data displayed (operation 810).

The advantageous embodiments shown in FIG. 8 are not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 9:
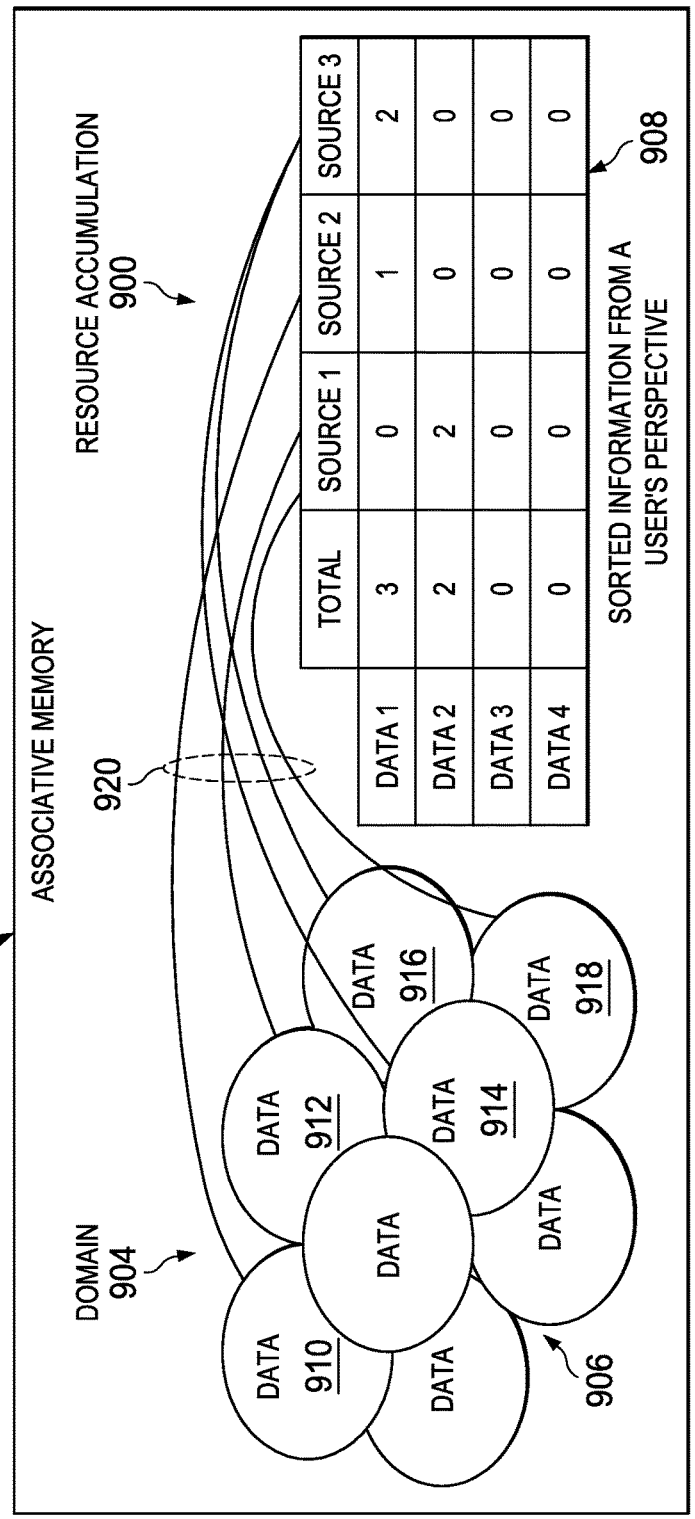
FIG. 9 is a drawing illustrating resource accumulation of results found as a result of a query on data in an associative memory, in accordance with an advantageous embodiment.

FIG. 9 is a drawing illustrating resource accumulation of results found as a result of a query on data in an associative memory, in accordance with an advantageous embodiment. The resource accumulation shown in drawing 900 may be implemented using an associative memory and the methods and devices described with respect to FIG. 1 through FIG. 3, as well as data processing system 1600 of FIG. 16. Drawing 900 illustrates a mechanism for accumulating resource information and data in such a manner to allow users to make quick decisions regarding which data is most relevant to the user's task, and possibly not ambiguous.

As with FIG. 6, the resource accumulation shown in drawing 900 of FIG. 9 may be implemented using associative memory 902, which may be associative memory 102 of FIG. 1. Domain 904 may contain various disparate data 906 within associative memory 902. FIG. 9 illustrates how disparate data 604 of FIG. 6 may be organized by resource accumulation, as shown by table 908. Table 908 may be an example of table 1000 in FIG. 10. For example, among all of disparate data 906, certain data elements may be organized into table 908. For example, data elements 910, 912, 914, 916, and 918 may be organized into table 908, as shown by lead lines 920.

Table 908 shows data organized by a total number of instances found and sources of where the data may be found. The more instances found, the more likely the data may be relevant to the user. Thus, the user's time may be more efficiently used searching what is probably the most relevant information. Likewise, the user may concentrate on searching in a source or sources having the most number of hits with respect to the sought-after data. On the other hand, users would not need to spend an undesirable amount of time by searching information with low counts or a low number of returns. Naturally, the user may use the information in table 908 in other ways.

Thus, the advantageous embodiments may use associative memory technology coupled with a custom user interface to enable quick decision-making by analyzing resource accumulations through the remembering of entities associated within a domain specific, predetermined perspective. The advantageous embodiments may organize the results so the user can focus on the entity with the greatest accumulation of information in order to make a quick decision concerning that perspective.

For example, suppose a supplier provides an analyst with a list of parts needed for a front landing gear. The analyst may rely on his or her experience or domain knowledge to decide on which part to locate first. If the analyst were unfamiliar with a given part, it is possible the analyst would postpone processing of that part regardless of its importance. The analyst may also process this list sequentially or randomly.

The advantageous embodiments may avoid the clutter that may result from typical entity analytic queries. Clutter, caused from an information overload, can overwhelm the user and make it difficult to evaluate the information at hand. The advantageous embodiments may circumvent this occurrence by providing results within a single perspective preselected by the user. Thus, the advantageous embodiments may cause the results to focus solely on the problem at hand.

The advantageous embodiments may reduce large amounts of data to simple accumulations and counts. This result may save a great deal of time when tasked to explore large data sets.

Thus, the advantageous embodiments may allow a user to quickly uncover the most valuable data within their result set. The advantageous embodiments may determine a value through accumulations or counts of associations, as shown in FIG. 9.

The advantageous embodiments have several advantages. For example, the advantageous embodiments may address problems in a predetermined perspective chosen by the user. The advantageous embodiments may display only the resource accumulation essential to the user's request. The advantageous embodiments may provide a quick mechanism to obtain key and important information used to make quick decisions. The advantageous embodiments may not be domain specific. The advantageous embodiments may be platform independent and portable. The advantageous embodiments may be flexible in that the advantageous embodiments may allow users to select single or multiple search terms, as well as add and remove data sources. The advantageous embodiments may increase the speed of data analysis, thereby saving time and money.

As an example, suppose the bottom of a wing of an airplane is to be serviced. An analyst could collect a list of parts within the wing. The analyst could then use the advantageous embodiments to determine the most important parts, based on their associations, and concentrate on those parts first as those parts have been predetermined to be the most important. This procedure could save the analyst time because many of these parts could be difficult to locate. By pre-ordering the parts, the time used to service the aircraft wing could be reduced.

FIG. 10 is a table illustrating resource accumulation of results found as a result of a query on data in an associative memory, in accordance with an advantageous embodiment. Table 1000 may be an example of table 908 in FIG. 9. Table 1000 may be table 908 of FIG. 9, for example.

Column 1002 may present a desired value or a list of desired values. For example, column 1002 could represent a part or a list of parts of interest to the user. Column 1002 may be an initial entity category within preselected perspective 1001. The values in column 1002 may be provided by a computer program, or may be provided by a user. The values in column 1002 may be provided in order to gain a better understanding of the subject matter at hand. The values in column 1002 may be a single entity or a list of entities. The user may preselect the category associated with these values. As long as the user stays within the assigned perspective, all the accumulated results will take that category's form.

Columns 1004, 1006, 1008, and 1010 represent resource values of the data within the domain. Thus, the values in columns 1004, 1006, 1008, and 1010 may identify all resources or data sources within the domain. Each value may represent an individual source that contains the count of data in column 1002 specified within the domain. Typically, these sources may be divided into logical units, defined by the user. Essentially, these sources may contain the underlining data that created the associative memories.

In turn, the cells within columns 1004, 1006, 1008, and 1010 may indicate total number of instances a given value in column 1002 occurs within the corresponding data source. Thus, for example, the second cell in column 1004 has a value of "11." This value means that 11 instances of part "XYZ" shown in the first cell of column 1002 occur within "source 1" shown in the first cell of column 1004.

Thus, the values shown in the cells of columns 1004, 1006, 1008, and 1010 may identify accumulated resources or counts of associations within each data source. The values indicate "interest" by pointing out their usage through accumulated counts, as shown in column 1012. The advantageous embodiments may sort these results to bring the greatest value to the top, as shown in cell 1014 of column 1004.

In other words, the value in cell 1014 may identify the total resource accumulation among all of the data sources within an associative memory. The value in cell 1014 may represent the "total interest" in the desired value. Values with large numbers of total resource counts in cell 1014 may indicate there are numerous associations to this value in column 1002 and therefore one might conclude the value is important. Likewise, values with small numbers of total resource counts in cell 1014 may indicate there are fewer associations to this value in column 1002 and therefore one might conclude the value is less or not important.

The various values shown in table 1000 are exemplary only. The values, numbers, categories, and other aspects of table 1000 may be varied as desired.

The advantageous embodiments may work with single entities as well as lists of entities. In either case, the analyst can quickly determine the interest or importance of returned information. The analyst may also determine what additional information to pursue.

In addition, the advantageous embodiments may display the count of each resource where few or no counts occur within a corresponding source. This feature may, in some cases, tend to indicate less value or importance.

Thus, the advantageous embodiments may employ a prioritizing technique that one can apply to any data set without having to deeply analyze the data first. The advantageous embodiments do not require a user to rely on previous experiences or past knowledge in order to prioritize the information within their data set. The advantageous embodiments may perform this task.

The advantageous embodiments may also provide a user with a sorted list of priorities based on perceived importance. The sorted list of priorities may be gathered from associations within the data. By providing accumulations or counts, the advantageous embodiments may avoid difficulty in determining the importance of items when presented with limited or excessive amounts of data.

Attention is now turned to an example of the advantageous embodiments in use. First, the user may be tasked to obtain knowledge within a large domain. Next, the user may input a specific information request in order to gain a better understanding of the subject matter at hand. For example, the user may be tasked to obtain knowledge about a list of damaged part numbers.

Next, the user may use associative memory technology to incorporate multiple analysis capabilities to produce a wide range of entity analytic results relating to the user request. The advantageous embodiments may then be used to process the input data and generate counts of accumulated resources for the user. The advantageous embodiments may organize or sort these accumulations by value or "interest", as shown in FIG. 10. Finally, the advantageous embodiments may return the sorted accumulated data to the user, so the user may focus their interest on the information that has the greatest value. Alternatively, if no value contains high counts, the user can quickly see that the data may be of limited value. Finally, a quick decision may be made by doing a detailed review of the information that is likely to have the most valuable information.

FIG. 11 is a drawing illustrating an insert perspective of associative memories for quick decision making, in accordance with an advantageous embodiment. The perspective insertion shown in drawing 1100 may be implemented using an associative memory and the methods and devices described with respect to FIG. 1 through FIG. 3, as well as data processing system 1600 of FIG. 16. Drawing 1100 illustrates a mechanism for incorporating an insert perspective into an associative memory in such a manner to allow users to make quick decisions.

The advantageous embodiments may employ a cohesive approach to inserting unstructured information into an associative memory technology on an ad-hoc basis. This feature enables quick decision-making based on result driven analysis through the remembering of entities associated within a domain specific, predetermined insert perspective. The advantageous embodiments may organize the results in an efficient manner that helps users discover relationships and associations in order to make timely decisions concerning newly acquired information. Thus, the advantageous embodiments may provide a dynamic way of understanding newly introduced data from an analytical point of view. The advantageous embodiments may employ a user interface application which may allow a user to interact more quickly and efficiently with an associative memory technology.

In an advantageous embodiment, the user may insert new information into the system, via insert perspective 1104. Each associative memory has an insert perspective type that acts as a catalyst and provides a feedback mechanism for all of the other perspectives. Insert perspective 1104 may take advantage of this fact to enable insertions into an associative memory of domain 1106. The data may then be manipulated by associative memory 1102 using insert perspective 1104, with the result organized from the point of view of user's perspective 1108.

FIG. 12 is a drawing illustrating use of an insert perspective of an associative memory, in accordance with an advantageous embodiment. Set of drawings 1200 may be implemented using a system, such as those shown in FIG. 1 through FIG. 3, as well as data processing system 1600 of FIG. 16. Set of drawings 1200 may be used to demonstrate use of insert perspective 1104 of FIG. 11. Associative memory 1202 may be an associative memory as described elsewhere herein, including but not limited to associative memory 102 of FIG. 1.

In an advantageous embodiment, drawing 1204 may be data to be inserted into associative memory 1202, such as an incident report, an email, a news article, or any material relating to the domain at hand. Drawing 1204 may display or represent new knowledge or information, previously not in the system. For example, the information could be a recent article, email, or some type of incident report. In any case, the information displayed in drawing 1204 is new and should be inserted into associative memory 1202 in order to obtain a better understanding of the subject matter.

Drawing 1206 shows an exemplary procedure for inserting the information from drawing 1204 into associative memory 1202. In an advantageous embodiment, the user may insert the new information into the system via a graphical user interface. The user may copy or otherwise input the textual information from drawing 1204 into the space provided. The advantageous embodiments may use a single insert perspective type to add data, such as insert perspective 1208. Each associative memory 1202 may have an insert perspective type 1208 that may act as a catalyst and provide a feedback mechanism for all of the other perspectives.

Next, the information in insert perspective 1208 is processed. The newly inserted information may be processed and synchronized with data currently in the system. The newly inserted information becomes part of the associative memory.

At this point, the information may be organized or reorganized from a user's perspective, as shown in drawing 1210. Thus, the resulting data, possibly organized in a perspective view, may help the user understand the information that was initially presented. The results may be broken into easily understandable words and terms that may be quickly interpreted. The advantageous embodiments may divide the results in a number of different ways.

In an advantageous embodiment, the results may be divided with an insert entity type with an insert identification. This inserted information may be automatically assigned a value in order to identify the information. This value may be consistent with the other inserted entity types within the system.

The results may also be divided using attribute cloud values of the inserted information. These values, possibly in the perspective view, may be attributes associated with the inserted information. These values may provide a quick summary by supplying a list of important words accumulated during the insertion.

The results may also be divided using the associated entity values, possibly in the perspective view, of the inserted information. These values may be entities associated with the inserted information. These values may be similar to the attributes above, except these values may carry more weight as entities. The user may search all or some of these values, if needed or desired.

The results may also be divided using associated keyword values, possibly in the perspective view, of the inserted information. These values may be keywords associated with the inserted information. These values may be similar to the attributes above, except they may carry more weight as keywords, but less than entities.

The results may also be divided by using associated values, possibly in the perspective view, of the entity category of the inserted information. These values may be entities associated with the inserted information and may share the same category value. These values may be similar to the attributes above, except they may carry more weight as entities. The user may search these values as well.

The results may also be divided by showing snippets, possibly in the perspective view, of underlying source data. This feature may provide the user with a snapshot of the resources pertaining to the inserted information. In this case, what is displayed is the location of the source of the attributes, entities, and keywords. In an advantageous embodiment, only a brief fragment of the data may be shown.

The results may also be divided by other entity values, possibly in the perspective view, like the inserted information. These values may share the same attributes as the inserted information. This feature may give the user the ability to quickly locate values just like the one inserted. The advantageous embodiments may rank and order these values by similarity, placing the most similar at the top.

Attention is now turned to another advantageous embodiment in use. First, new unstructured information is presented to the user. The new unstructured information may take many forms. For instance, the new unstructured information may be an incident report.

Next, the user may be tasked to investigate new information recently discovered. For example, a user may be tasked to examine a recently released incident report concerning an in-flight phenomenon.

The user then inserts information into the system. For example, the user may input the incident report into an associate memory in order to gain a better understanding of the incident. To accomplish this task, the user may copy and paste the incident report into the system using a graphical user interface, such as that shown in drawing 1206.

Instead, the user may cause associative memory 1202 to use multiple analysis capabilities to produce a wide range of entity analytic results relating to the user request. Normally, associative memory 1202 may process incoming data through a predefined channel. In an advantageous embodiment, the user may bypass the normal data flow process because of the information's dynamic nature.

Next, the advantageous embodiments may process the input data dynamically and formulate its results for the user. The advantageous embodiments may organize the results to enable quick decision-making, as shown in drawing 1210.

The advantageous embodiments may then return the associated information organized from a user's perspective. A quick, efficient, and correct decision may then be made by focusing on the necessary or most desirable knowledge useful for completing the task at hand.

The advantageous embodiments may resolve issues regarding analyzing newly acquired data by means of an associative memory technology. In particular, the advantageous embodiments provide a user with the ability to investigate new unstructured data that covers both breadth and depth, in order to make quick and accurate decisions.

For example, a flight engineer may obtain a report describing an in-flight phenomenon incident that occurred the night before on an airplane the flight engineer serviced. The flight engineer may want to examine the report to try to understand what happened and how to respond appropriately to the phenomenon. The flight engineer may want to compare the incident to any previous and related phenomenon to determine if a common solution exists for the current phenomenon. However, to exploit this information accurately in a quick manner using an associative memory is very difficult.

Following the example used above, the flight engineer may take the following actions. First, the flight engineer may read the report. The flight engineer would then locate keywords within the report to best query a database or associative memory to find historical data. The flight engineer may then compare the relevancy of historical data to form a decision.

However, there are numerous drawbacks to these steps. First, the entire process is likely to be time consuming and is not geared towards quick decision-making. Second, the process may be error prone and somewhat dependent on the knowledge of the reader. Third, any mistakes or wrong comparisons could lead the user to make an incorrect or incomplete decision.

In addition, when working with associative memory technology, the established protocol may be to gather data first and then analyze the data. In cases where new data is introduced, the new data first must be loaded into the system and then processed in order to be used. This fact makes it difficult for an analyst to obtain immediate results from a report that does not follow the normal automated data flow.

The advantageous embodiments recognize these and other issues and satisfactorily addresses them. The advantageous embodiments described with respect to FIG. 12 may allow users to make quick, informed decisions without having to pour over massive amounts of newly introduced data. By using an insert perspective to enter data, and then organize the data according to the user's perspective, these goals may be accomplished.

More particularly, the advantageous embodiments may organize the new data in a way that provides the most important information first. This information may be condensed and summarized so that the user may read a few words rather than multiple pages. The advantageous embodiments may also provide transparency typically not seen with most associative memory insertion techniques. Instead, the advantageous embodiments may clearly identify what is being inserted, the status of that insertion, and the results gathered from its analysis.

Another advantage of the advantageous embodiments is the use of a single perspective to insert data. The advantageous embodiments may insert all data, regardless of its nature, in the same way. This feature may act as a single entry point into the associative memory, thus reducing erroneous or incomplete insertions into multiple locations.

Figure 13:
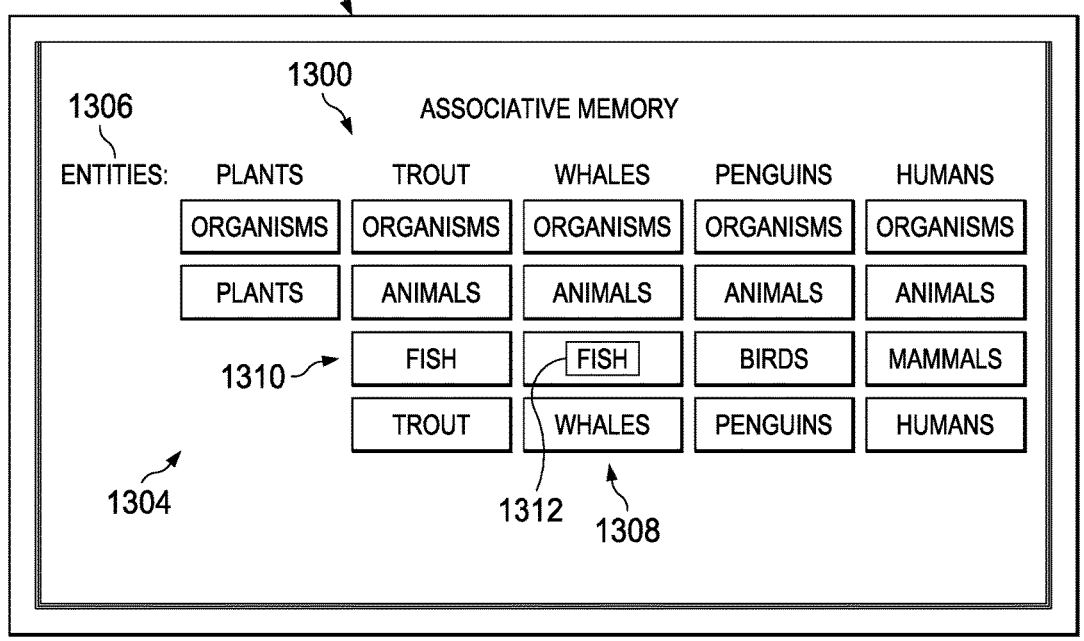
FIG. 13 is a table illustrating an error in an associative memory, in accordance with an advantageous embodiment.

FIG. 13 is a table illustrating an example of an error in an associative memory, in accordance with an advantageous embodiment. The advantageous embodiments described with respect to FIG. 13 may demonstrate how it may not be possible to change data once it is introduced to an associative memory.

For example, table 1300 may represent data and relationships stored in associative memory 1302. However, associative memory 1302 need not store the data shown in table 1300 in the manner shown in FIG. 13. Table 1300 or associative memory 1302 may take the form of a non-transitory computer readable storage medium, such as persistent storage 1608 or computer readable storage media 1624 of FIG. 16. The data in table 1300 or associative memory 1302 may be manipulated by a processor, such as processor unit 1604 of FIG. 16. FIG. 13 demonstrates an error in table 1300 that may be addressed using procedures similar to those described with respect to FIG. 12. One distinction, however, may be that the new information may be automatically associated with the original entity to which it was added.

Table 1300 is organized according to columns 1304 and rows 1306. Columns 1304 represent different entities, represented for example only by living organisms. Thus, for example, column 1308 contains entries relating to whales.

In turn, rows 1306 represent different entity relationships with respect to an entity represented by columns 1304. Thus, for example, row 1310 may relate to a classification of a living entity represented in columns 1304.

Attention is now turned to the error in table 1300. Cell 1312 corresponds to the intersection of column 1308 and row 1310, meaning that cell 1312 should contain the classification type (row 1310) of the living organism "whale" (column 1308). The data in cell 1312 indicates that a "whale" is a "fish." This entry is incorrect, because a whale should have been properly classified as a mammal. Upon discovering this error, a user may wish to update table 1300 and/or associative memory 1302 so that the correct classification of a "whale" is properly represented.

This type of error may be corrected advantageously using procedures similar to those described with respect to FIG. 12, with one distinction possibly being that the new inserted information may be automatically associated with the original entity to which it was added. However, attention is first turned to why this type of error correction may be non-trivial with respect to associative memory 1302.

The advantageous embodiments may solve an associative memory workflow issue. Once information, such as the incorrect data in cell 1312, is in associative memory 1302, there is no way to leverage outside analysis of that information within the system. As a result, the error may be very difficult to correct.

The advantageous embodiments provide for a feedback mechanism that allows users to insert additional information concerning the erroneous data. Once introduced, the new information may alter the data's associations immediately, and thereby provide results that are more aligned with what the user wants to see.

For example, consider the error shown in cell 1312 of FIG. 13. Users may discover this error every time this sequence is reexamined. This error would continue to occur until a user, typically an administrator, fixed the entirety of associative memory 1302. However, fixing the entirety of associative memory 1302 may be a non-trivial, time-consuming process.

Aside from fixing the entirety of associative memory 1302, users have few options. A user might leave the information unchanged, but then each other user may rediscover the problem. This technique may be an inefficient use of resources and may be very time consuming.

A user could communicate to others, through a different means such as verbal or written, the information they intended to impose on associative memory 1302. However, this technique divides the information, keeping part of the information in the memory and part of the information somewhere else. This technique could be confusing when retrieving the information.

A user could rely on public knowledge, industry standards, or common sense, for example, so that other users would recognize the true nature of the error. For example, the fact that a whale is not a fish, but rather is a mammal, is public knowledge. However, this technique may assume everyone shares the same public knowledge, industry standards, and common sense. Unfortunately, this assumption may not always be valid.

All of these techniques fail to address the workflow problem accurately. However, the advantageous embodiments may incorporate the user's input immediately into the system, so that everyone can leverage his or her knowledge immediately. The user input may take the form of corrections, additional details, explanations, relative work experience, symbols, pictures, audio files, or any other data.

The new information may also be referred to as added information. The added information may be dynamically correlated to the original entity and results formulated for the user. These procedures may be performed using the techniques described above with respect to FIG. 12.

In an advantageous embodiment, the system may provide an analysis of the added information first, allowing the user to compare the added information with other entities similar to the added information. Then the user can navigate back to the original entity and view the updated associations created from the additional information. Subsequently, the user or a computer program may make a quick decision by focusing on the knowledge needed or desired to complete the task at hand. Furthermore, other users may leverage the added information because the added information is now part of the system. The added information may be sorted so that the added information appears first, thereby permitting others to reap the added information's benefits quickly.

Attention is now returned to FIG. 12, though the drawings are now used to demonstrate correction of errors or modification of information as described with respect to FIG. 13. In an advantageous embodiment, a user may add new information, such as for example to correct the error in cell 1312 of FIG. 13. The user may add the new information via a graphic user interface, such as drawing 1206 of FIG. 12. In particular, the user may add the new information via insert perspective 1208 of FIG. 12.

This system may then use a single insert perspective type to add the data. As described above, each associative memory may have an insert perspective type that may act as a catalyst and provide a feedback mechanism for all of the other perspectives. This insert perspective may enable insertions.

In an advantageous embodiment, the newly added information is processed by the system. In particular, the system may synchronize the newly added data with data currently in the system. Thus, the newly added data may become part of the associative memory.

The system then provides a link back to the original entity. In this manner, the user may navigate back and view the updated associations created from the additional information. This information may be viewed in drawing 1210 of FIG. 12.

Drawing 1210 may also include a snapshot of the inserted information. In another advantageous embodiment, the most recently added data may be displayed first within drawing 1210.

In an advantageous embodiment, the new information may be reorganized from a user perspective. The resulting data, organized in a familiar manner, may help the user understand the newly added information. The results may be subdivided or sorted into easily understandable words and terms that a user can quickly interpret.

Thus, the advantageous embodiments may enable users to add new information to existing entities. Once added, the new information may become an entity itself, allowing a user to analyze the new information in the same manner as other information.

One distinction, however, may be that the new information may be automatically associated with the original entity to which the new information was added. This feature may permit the user to navigate back to the new information in order to see what effect the added information may have had on the original entity. A user may assign additional predefined associations by updating the memory's data schema and programming interface.

Thus, the advantageous embodiments may provide a complete workflow that accommodates dynamic decisions. The advantageous embodiments may allow users to insert new information pertaining to an entity without having to upset an associative memory or the flow of the decision-making process. Furthermore, the advantageous embodiments may incorporate the user's input immediately into the system. Once introduced, the new information may propagate through the entire system and may be immediately available for everyone to use.

Figure 14:
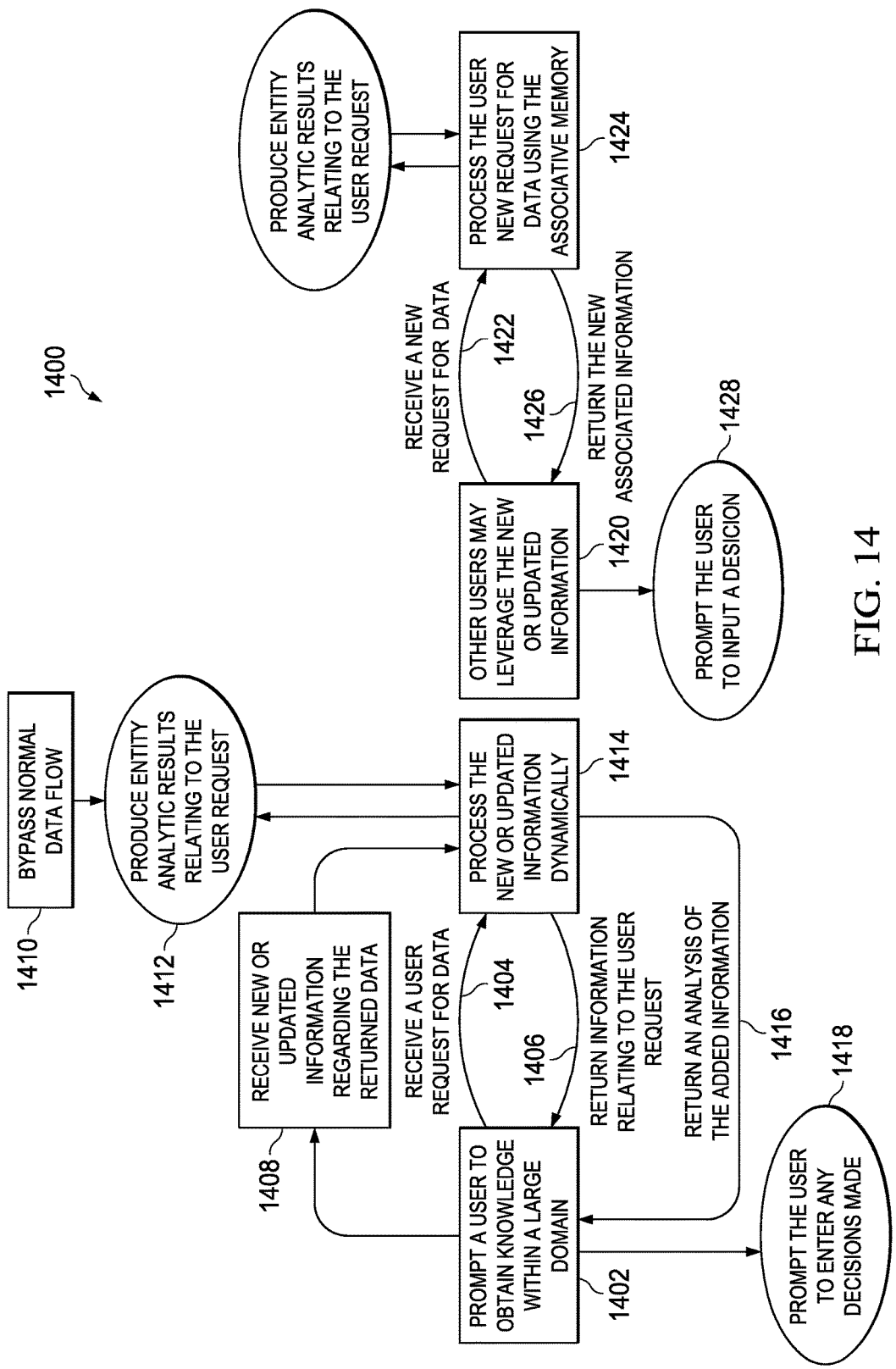
FIG. 14 is a flowchart illustrating a process of dynamically updating an associative memory, in accordance with an advantageous embodiment.

FIG. 14 is a flowchart illustrating a process of dynamically updating an associative memory, in accordance with an advantageous embodiment. Process 1400 shown in FIG. 14 may be implemented in a module, system, or data processing system, such as system 100 of FIG. 1, system 200 of FIG. 2, or data processing system 1600 of FIG. 16. Process 1400 described with respect to FIG. 14 may be implemented in the form of a non-transitory computer readable storage medium storing computer readable code which, when implemented by a processor, may execute the method described with respect to FIG. 14. While the operations of FIG. 14 are described as being implemented by a "system," process 1400 is not limited to being implemented by the systems of FIG. 1 and FIG. 2, but also may be implemented by one or more real or virtual data processing systems, possibly in a distributed or networked environment. Process 1400 may be implemented using hardware, software, or a combination thereof.

Process 1400 may begin with the system prompting a user to obtain knowledge within a large domain (operation 1402). This operation may be optional. For example, a user may decide to perform this task upon the user's own initiative, or may be given the task by some other person. The task may take any form. However, in a non-limiting example, the task might take the form of obtaining information concerning a report regarding a type of automobile.

Next, the system may receive a user request for data (operation 1404). In an advantageous embodiment, the user may request specific information in order to gain a better understanding of the subject matter at hand. For example, the user may be tasked to obtain knowledge about an automobile report. Thus, the system may receive user input of an identification number for the automobile report.

Next, the system may return information relating to the user request (operation 1406). The returned information may be based on a query to the associative memory that is based on the user input. Upon inspection, the user may decide the information returned is not sufficient for the user's purposes. As a result, the system receives additional user input in the form of additional information in order to obtain better results, from the perspective of the user.

The user may then determine that new or updated information should be added to the returned data. As a result, the system may receive new or updated information regarding the returned data (operation 1408). The new or updated information could be a correction, further analysis, or additional details. For example, a user may desire to add an automotive recall analysis to the results obtained in order to influence the associations. The recall analysis may cite direct information correlating with the automobile report.

Optionally, the system may then bypass normal data flow (operation 1410). The system may bypass the normal data flow process because of the information's dynamic nature and the information's direct correlation to the entity at hand.

The system may then produce entity analytic results relating to the user request (operation 1412). In an advantageous embodiment, the system may specifically use the multiple analysis capabilities of an associative memory to produce a wide range of results. Had the normal data flow been used at operation 1410, then the system may have processed the user request through a predefined channel, which may have limited the results obtained.

Next the system may process the new or updated information dynamically (operation 1414). The term "process the new or updated information dynamically" may mean in some cases that the associative memory correlates the new or updated information to the original entity, and then the system may formulate the results for the user. The formulated results may be displayed according to the advantageous embodiments described elsewhere herein, such as but not limited to FIG. 4, FIG. 7, FIG. 12, FIG. 13, and FIG. 15.

Next, the system may return an analysis of the added information (operation 1416). The user may then compare the new or updated information with other similar entities. The user may then navigate back to the original entity and view the updated associations created from the new or updated information.

Optionally, the system may then prompt the user to enter any decisions made (operation 1418). This operation may be optional in the sense that the user may take some action outside the system. For example, the user may make a quick decision relating to the task by focusing only on the most relevant knowledge to complete the task at hand.

Also optionally, other users may leverage the new or updated information (operation 1420). Other users can leverage the new or updated information because it is now part of the associative memory. The new or updated information may be sorted so that new or updated information appears first. In this manner, other users may quickly take advantage of the benefits offered by the new or updated information.

For example, the system may receive a new request for data (operation 1422). The system may then process the user new request for data using the associative memory (operation 1424). The system may then return the new associated information (operation 1426). Optionally, the system may prompt the user to input a decision (operation 1428). However, this decision may be taken outside of the system. The process may terminate thereafter.

FIG. 15 is a drawing illustrating a worksheet view for results derived as a result of querying an associative memory, in accordance with an advantageous embodiment. Worksheet 1500 may be, in an advantageous embodiment, a worksheet showing results displayed to a user. The results may be of a query performed on an associative memory. Worksheet 1500 may be implemented using an associative memory, such as associative memory 102 of FIG. 1 or any of the other associative memories described herein. System 100 of FIG. 1 may also be used to implement worksheet 1500. Data processing system 1600 of FIG. 16 may be used to generate, display, print, and otherwise manage worksheet 1500. Worksheet 1500 may be an alternative view of data in an associative memory. Worksheet 1500 may represent, in some advantageous embodiments, a graphical user interface presented to a user.

Applicants first address why worksheet 1500 may represent an advantage over current techniques for displaying results of searches when querying an associative memory. When searching a problem domain for solutions, users tend to narrow their focus on the perspective at hand. As a result, a user may fail to notice that a broader problem and solution may exist.

For instance, an engineer searching for a solution to a specific wiring improvement on a vehicle might fail to notice a larger improvement may be performed with respect to that entire year's production of vehicles, or perhaps that a larger improvement may need to be performed at a particular vehicle factory location. Instead, by focusing only on a specific instance of the wiring improvement, the engineer may return to the issue multiple times before noticing a pattern that was not obvious upon initial investigation. After each return, the engineer may spend unnecessary time attempting to perform the same procedure on a different vehicle, only to realize the issue was much larger than originally perceived.

This happenstance may occur even with widely known problems, because of the tendency of some people to focus so closely on the problem at hand. Many times, users may overlook what, at a later date, might be obvious in hindsight. For example, repeated wiring improvements at a particular facility may have been performed faster than at other facilities. After a long investigation, the improvement was tracked down to a single electrician whose wiring procedures were unexpected. Thus, a way to improve the speed of wiring improvements at all facilities, in hindsight, would be to learn from the single electrician's unexpected wiring procedures. However, the change in procedures would not have been obvious otherwise, and some other cause may have been attributed to the facility's success.

The advantageous embodiments take these considerations into account and provide a systematic way of presenting information in order to find and highlight underlying trends that may not be obvious at first, but may be obvious later in hindsight. An exemplary procedure might be as follows.

First, a user may be tasked to obtain knowledge concerning an issue within a large domain. The user may then describe the problem in order to gain a better understanding of the subject matter at hand. For example, a mechanic may be tasked to obtain knowledge concerning improvements to an automobile's front coil spring. The mechanic may use a graphical user interface to input information describing the issue.

The user may use an associative memory technology to incorporate multiple analysis capabilities to produce a wide range of entity analytic results relating to the coil spring issue. The advantageous embodiments may then display the results and formulate them for the user. The advantageous embodiments may organize the results into two categories, the entity type associations and all the associations. These associations may provide the user with valuable information that aids their decision.

The advantageous embodiments may return a list of entity type results, whose source contains attributes that match with the terms in the problem description. For example, if a user wanted to locate parts for a "front assembly", the returned list would contain those parts with matching terms "front" or "assembly" or both.

The advantageous embodiments may also return a list of all entity type results as well. These results may provide the user with valuable information which may be non-obvious. The user may be provided with valuable information for which the user did not know to ask. For example, if a user wanted to locate parts for a front assembly, the returned list may contain not only parts, but also other entities such as models, operators, and others. This feature is valuable because this feature forces the user to look outside the user's perspective to see if there is a broader issue and/or a greater solution or approach. As a result, the user may make a quick decision by obtaining only the necessary data needed to complete the task at hand.

In an advantageous embodiment, the user may start with a problem description entered in perspective 1501. Part or all of this description may appear in a title for worksheet 1500, such as title 1502. Alternatively, title 1502 may refer to any information, not necessarily the problem description. One or more input sections may be present. For example, in the advantageous embodiment shown in FIG. 15, the input sections may be required input section 1504, optional input section 1506, and excluded input section 1508. For this example, the user may select "coil" as a required term and "spring," "front," and "tire" as optional. The user may experiment with these sections to see which combination of search terms may yield the best results as perceived by the user. As indicated above, more or fewer input sections may be present, and some, none, or all of the information entered into the input sections may appear within title 1502.

Required input section 1504 also may be used to enter required information with respect to performing a query using an open attribute query language. "Required information" is determined with respect to a user's perception of what is "required" for a given search, and is not limiting of the advantageous embodiments. These values may be required terms in an issue description. Information entered in required input section 1504 may match exactly in order to be counted towards the associated results.

Optional input section 1506 may be used to input optional information. The values entered in optional input section 1506 may be optional terms in the issue description. The term "optional" is determined with respect to a user's perception of what is "optional" for a given search, and is not limiting of the advantageous embodiments. Information entered in optional input section 1506 may not be required to match exactly in order to be counted towards the association results. Instead, if the user enters multiple terms, each term is evaluated independently.

Excluded input section 1508 may be used to input information to be excluded from a query. Thus, the values entered in excluded input section 1508 may represent excluded terms in the issue description. The term "excluded" is determined with respect to a user's perception of what is "excluded" for a given search, and is not limiting of the advantageous embodiments. Information entered in excluded input section 1508 may exclude answers from the result list where the result's attribute list contains one or more of these terms.

More or fewer input sections may be present. For example, an additional input section may be provided in order to receive an instruction to perform a query of an associative memory. Thus, for example, selecting or otherwise actuating the additional input section may be used to initiate an association search.

In the example illustrated in FIG. 15, the results returned by the invention may be divided into two categories. The first category may be associated report 1510, which corresponds to the preselected perspective. Associated report 1510 may show a list of reports where the attributes within each report matches with the original issue description. At this point, the user may investigate each report to see if the user might gain some insight into the task at hand.

The second category may be associated information 1512. Associated information 1512 may provide additional information for which the user might not have thought to search. Further investigation showed that the manufacturer improved 9-3 model 1514 of the product due to its improved coil springs. This fact would have probably become obvious to the user after investigating each report. Nevertheless, the visibility provided in the second category shows the issue description has a high correlation to the attributes of 9-3 model 1514.

This conclusion implies that the real issue regarding the task at hand may be in the entire series of 9-3 model 1514, not just in a few reports. This knowledge may save the user a lot of time when determining how to improve the model at hand, by providing the user with better information when making quick and informed decisions.

In addition, associated information 1512 may show non-obvious relationships that exist between the desired entities and all the other entities within the associative memory. Many of these relationships may yield positive correlations that may surprise most users by calling attention to potentially larger problems.

Thus, the advantageous embodiments may provide a systematic and uniform approach to identifying solutions, even those that exist outside of a user's immediate perspective. The advantageous embodiments also may provide users with information they "didn't ask for", allowing the users to draw previously unconsidered conclusions. The advantageous embodiments may also present the user with non-obvious relationships, which in turn helps the user to better understand the entire issue domain.

Worksheet 1500 may have other advantages. For example, the advantageous embodiments may address problems in a predetermined perspective chosen by the user, but show results in all the perspectives. The advantageous embodiments may display only the key aspects essential to the user's request, at the option of the user and as "key" and "essential" are determined by the user. The advantageous embodiments may provide a quick way to obtain information used to make quick decisions. The advantageous embodiments may perform multiple entity analytic tasks and display all of the results in one location on a display. The advantageous embodiments need not be domain specific. The advantageous embodiments may be platform independent and portable. The advantageous embodiments may be flexible in that the advantageous embodiments may allow users to save and remove worksheets. The advantageous embodiments are not limited to the above.

Turning now to FIG. 16, an illustration of a data processing system is depicted in accordance with an advantageous embodiment. Data processing system 1600 in FIG. 16 is an example of a data processing system that may be used to implement the advantageous embodiments, such as system 100 of FIG. 1, or any other module or system or process disclosed herein. In this illustrative example, data processing system 1600 includes communications fabric 1602, which provides communications between processor unit 1604, memory 1606, persistent storage 1608, communications unit 1610, input/output (I/O) unit 1612, and display 1614.

Processor unit 1604 serves to execute instructions for software that may be loaded into memory 1606. Processor unit 1604 may be a number of processors, a multi-processor core, or some other type of processor, depending on the particular implementation. A number, as used herein with reference to an item, means one or more items. Further, processor unit 1604 may be implemented using a number of heterogeneous processor systems in which a main processor is present with secondary processors on a single chip. As another illustrative example, processor unit 1604 may be a symmetric multi-processor system containing multiple processors of the same type.

Memory 1606 and persistent storage 1608 are examples of storage devices 1616. A storage device is any piece of hardware that is capable of storing information, such as, for example, without limitation, data, program code in functional form, and/or other suitable information either on a temporary basis and/or a permanent basis. Storage devices 1616 may also be referred to as computer readable storage devices in these examples. Memory 1606, in these examples, may be, for example, a random access memory or any other suitable volatile or non-volatile storage device. Persistent storage 1608 may take various forms, depending on the particular implementation.

For example, persistent storage 1608 may contain one or more components or devices. For example, persistent storage 1608 may be a hard drive, a flash memory, a rewritable optical disk, a rewritable magnetic tape, or some combination of the above. The media used by persistent storage 1608 also may be removable. For example, a removable hard drive may be used for persistent storage 1608.

Communications unit 1610, in these examples, provides for communications with other data processing systems or devices. In these examples, communications unit 1610 is a network interface card. Communications unit 1610 may provide communications through the use of either or both physical and wireless communications links.

Input/output unit 1612 allows for input and output of data with other devices that may be connected to data processing system 1600. For example, input/output unit 1612 may provide a connection for user input through a keyboard, a mouse, and/or some other suitable input device. Further, input/output unit 1612 may send output to a printer. Display 1614 provides a mechanism to display information to a user.

Instructions for the operating system, applications, and/or programs may be located in storage devices 1616, which are in communication with processor unit 1604 through communications fabric 1602. In these illustrative examples, the instructions are in a functional form on persistent storage 1608. These instructions may be loaded into memory 1606 for execution by processor unit 1604. The processes of the different embodiments may be performed by processor unit 1604 using computer implemented instructions, which may be located in a memory, such as memory 1606.

These instructions are referred to as program code, computer usable program code, or computer readable program code that may be read and executed by a processor in processor unit 1604. The program code in the different embodiments may be embodied on different physical or computer readable storage media, such as memory 1606 or persistent storage 1608.

Program code 1618 is located in a functional form on computer readable media 1620 that is selectively removable and may be loaded onto or transferred to data processing system 1600 for execution by processor unit 1604. Program code 1618 and computer readable media 1620 form computer program product 1622 in these examples. In one example, computer readable media 1620 may be computer readable storage media 1624 or computer readable signal media 1626. Computer readable storage media 1624 may include, for example, an optical or magnetic disk that is inserted or placed into a drive or other device that is part of persistent storage 1608 for transfer onto a storage device, such as a hard drive, that is part of persistent storage 1608. Computer readable storage media 1624 also may take the form of a persistent storage, such as a hard drive, a thumb drive, or a flash memory, that is connected to data processing system 1600. In some instances, computer readable storage media 1624 may not be removable from data processing system 1600.

Alternatively, program code 1618 may be transferred to data processing system 1600 using computer readable signal media 1626. Computer readable signal media 1626 may be, for example, a propagated data signal containing program code 1618. For example, computer readable signal media 1626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 1618 may be downloaded over a network to persistent storage 1608 from another device or data processing system through computer readable signal media 1626 for use within data processing system 1600. For instance, program code stored in a computer readable storage medium in a server data processing system may be downloaded over a network from the server to data processing system 1600. The data processing system providing program code 1618 may be a server computer, a client computer, or some other device capable of storing and transmitting program code 1618.

The different components illustrated for data processing system 1600 are not meant to provide architectural limitations to the manner in which different embodiments may be implemented. The different advantageous embodiments may be implemented in a data processing system including components in addition to or in place of those illustrated for data processing system 1600. Other components shown in FIG. 16 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1604 may take the form of a hardware unit that has circuits that are manufactured or configured for a particular use. This type of hardware may perform operations without needing program code to be loaded into a memory from a storage device to be configured to perform the operations.

For example, when processor unit 1604 takes the form of a hardware unit, processor unit 1604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1618 may be omitted because the processes for the different embodiments are implemented in a hardware unit.

In still another illustrative example, processor unit 1604 may be implemented using a combination of processors found in computers and hardware units. Processor unit 1604 may have a number of hardware units and a number of processors that are configured to run program code 1618. With this depicted example, some of the processes may be implemented in the number of hardware units, while other processes may be implemented in the number of processors.

As another example, a storage device in data processing system 1600 is any hardware apparatus that may store data. Memory 1606, persistent storage 1608, and computer readable media 1620 are examples of storage devices in a tangible form.

In another example, a bus system may be used to implement communications fabric 1602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1606, or a cache, such as found in an interface and memory controller hub that may be present in communications fabric 1602.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk—read only memory (CD-ROM), compact disk—read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

Thus, the advantageous embodiments address the issue of finding relationships in a vast plurality of data in order to make specific decisions regarding particular situations. The advantageous embodiments utilize associative memory technology to perform such tasks.

The advantageous embodiments may take advantage of perspectives or view, including insert perspective, to find effective relationships, such as shown with respect to FIG. 1 through FIG. 16. The advantageous embodiments may be used to find and/or resolve ambiguous data within an associative memory, such as shown with respect to FIG. 1 through FIG. 5. The advantageous embodiments may be used to present perspective views of results or other data within an associative memory, such as shown with respect to FIG. 6 through FIG. 8. The advantageous embodiments may be used to find and display resource accumulations, such as shown with respect to FIG. 9 and FIG. 10. The advantageous embodiments may describe insert perspective of associative memories for quick decision making, as shown with respect to FIG. 11 and FIG. 12. The advantageous embodiments may be used for finding and resolving errors in an associative memory quickly and efficiently, as shown with respect to FIG. 13 and FIG. 14. The advantageous embodiments may be used to display a worksheet view for results derived as a result of querying an associative memory, as shown with respect to FIG. 15. The advantageous embodiments may have many other uses and applications.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system comprising:
a processor;
an associative memory comprising a plurality of data and a plurality of associations among the plurality of data, wherein the plurality of data is collected into associated groups, and wherein the associative memory is configured to be queried based on at least one relationship, selected from a group that includes direct and indirect relationships, among the plurality of data in addition to direct correlations among the plurality of data;
an input module configured to receive a value within a first perspective of the associative memory, wherein the first perspective comprises a first choice of context for a group of data within the plurality of data;
a query module configured to perform an open query of the associative memory using the value, wherein the query module is further configured to perform the open query within at least one of an insert perspective and a second perspective of the associative memory, wherein the insert perspective comprises a type of perspective which is configured to be fed back into the associative memory, wherein the second perspective comprises a second choice of context for the group of data, and wherein the at least one of the insert perspective and the second perspective has as many or more category associations for the value relative to the first perspective; and
a display module configured to display a result of the open query, wherein the display module is further configured to display a list of one or more potential ambiguities that result from the open query.

2. The system of claim 1, wherein the one or more potential ambiguities comprises a plurality of matching attributes for the value.

3. The system of claim 2, wherein the value comprises a first number and wherein the plurality of matching attributes comprises a first attribute that matches the value and a second attribute that matches the value, wherein the first attribute comprises a first category associated with the first number, wherein the second attribute comprises a second category associated with the first number, and wherein a determination cannot be made by examining only the first number whether the first number should belong, as perceived by a user or a computer program, to the first category or to the second category.

4. The system of claim 2, wherein the value comprises at least one of a set of alphanumeric characters and a set of special characters, wherein the special characters comprise at least one of a punctuation marks, a symbol, a picture, and a character selected from a language that uses non-alphabetic characters.

5. The system of claim 3, wherein the display module is further configured to display a first category name for the first category and a second category name for the second category.

6. The system of claim 3, wherein the display module is further configured to provide a first link associated with the first category and a second link associated with the second category, wherein the first link points to
first information associated with the first category, and wherein the second link points to second information associated with the second category.

7. The system of claim 1, wherein the open query is performed using an open attribute query language search.

8. The system of claim 3, wherein the one or more potential ambiguities arise because differences exist between the first category and an initial category name when performing the determination.

9. The system of claim 1, wherein, with respect to the associative memory, the first perspective is a choice of a context for a particular aspect of a domain.

10. The system of claim 1, wherein, a first category of an entity and the first perspective are preselected and are associated with the value.

11. A computer implemented method comprising:
receiving a value within a first perspective of an associative memory, wherein the first perspective comprises a first choice of context for a group of data within a plurality of data, wherein the associative memory comprises a plurality of data and a plurality of associations among the plurality of data, wherein the plurality of data is collected into associated groups, and wherein the associative memory is configured to be queried based on at least one relationship, selected from a group that includes direct and indirect relationships, among the plurality of data in addition to direct correlations among the plurality of data;
performing an open query of the associative memory using the value, wherein the open query is performed within at least one of an insert perspective and a second perspective of the associative memory, wherein the insert perspective comprises a type of perspective which is configured to be fed back into the associative memory, wherein the second perspective comprises a second choice of context for the group of data, and wherein the at least one of the insert perspective and the second perspective has as many or more category associations for the value relative to the first perspective; and
displaying a result of the open query, including displaying a list of one or more potential ambiguities that result from the open query.

12. The computer implemented method of claim 11, wherein the one or more potential ambiguities comprises a plurality of matching attributes for the value.

13. The computer implemented method of claim 12, wherein the value comprises a first number and wherein the plurality of matching attributes comprises a first attribute that matches the value and a second attribute that matches the value, wherein the first attribute comprises a first category associated with the first number, wherein the second attribute comprises a second category associated with the first number, and wherein a determination cannot be made by examining only the first number whether the first number should belong, as perceived by a user or a computer program, to the first category or to the second category.

14. The computer implemented method of claim 12, wherein the value comprises at least one of a set of alphanumeric characters and a set of special characters, wherein the special characters comprise at least one of a punctuation marks, a symbol, a picture, and a character selected from a language that uses non-alphabetic characters.

15. The computer implemented method of claim 13, wherein displaying further comprises displaying a first category name for the first category and a second category name for the second category.

16. The computer implemented method of claim 13, wherein displaying further comprises providing a first link associated with the first category and a second link associated with the second category, wherein the first link points to first information associated with the first category, and wherein the second link points to second information associated with the second category.

17. The computer implemented method of claim 11, wherein performing the open query comprises performing the open query using an open attribute query language search.

18. The computer implemented method of claim 13, wherein the one or more potential ambiguities arise because differences exist between the first category and an initial category name when performing the determination.

19. A non-transitory computer readable storage medium storing computer readable code comprising:
    computer readable code for receiving a value within a first perspective of an associative memory, wherein the first perspective comprises a first choice of context for a group of data within a plurality of data, wherein the associative memory comprises a plurality of data and a plurality of associations among the plurality of data, wherein the plurality of data is collected into associated groups, and wherein the associative memory is configured to be queried based on at least one relationship, selected from a group that includes direct and indirect relationships, among the plurality of data in addition to direct correlations among the plurality of data;
    computer readable code for performing an open query of the associative memory using the value, wherein the open query is performed within at least one of an insert perspective and a second perspective of the associative memory, wherein the insert perspective comprises a type of perspective which is configured to be fed back into the associative memory, wherein the second perspective comprises a second choice of context for the group of data, and wherein the at least one of the insert perspective and the second perspective has as many or more category associations for the value relative to the first perspective; and
    computer readable code for displaying a result of the open query, including displaying a list of one or more potential ambiguities that result from the open query.

20. The non-transitory computer readable storage medium of claim 19, wherein the one or more potential ambiguities comprises a plurality of matching attributes for the value.

\* \* \* \* \*